US011539398B1

(12) United States Patent
Wijaya et al.

(10) Patent No.: US 11,539,398 B1
(45) Date of Patent: Dec. 27, 2022

(54) VARIABLE PLC ATTENUATOR AND AMPLIFIER

(71) Applicant: Bendix Commercial Vehicle Systems LLC, Avon, OH (US)

(72) Inventors: Tandi Wijaya, Avon, OH (US); Timothy J. Frashure, Avon, OH (US); Michael D. Cremona, Avon, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 0 days.

(21) Appl. No.: 17/578,813

(22) Filed: Jan. 19, 2022

(51) Int. Cl.

| | |
|---|---|
| ***H04B 3/56*** | (2006.01) |
| ***H04B 3/46*** | (2015.01) |
| ***H04B 3/54*** | (2006.01) |

(52) U.S. Cl.
CPC ................. *H04B 3/56* (2013.01); *H04B 3/46* (2013.01); *H04B 3/546* (2013.01)

(58) Field of Classification Search
CPC ... H04B 3/56; H04B 3/46; H04B 3/32; H04B 3/546; H04B 2203/5425
See application file for complete search history.

(56) References Cited

U.S. PATENT DOCUMENTS

| | | | | |
|---|---|---|---|---|
| 6,694,235 | B2 * | 2/2004 | Akiyama | H04L 67/12 455/418 |
| 9,742,601 | B2 | 8/2017 | Streit | |
| 10,050,674 | B1 * | 8/2018 | Hayes | H04B 3/542 |
| 2010/0117734 | A1 * | 5/2010 | Hurwitz | H03F 3/72 330/253 |
| 2014/0109182 | A1 * | 4/2014 | Smith | H04L 63/1416 726/3 |

* cited by examiner

*Primary Examiner* — Khanh C Tran
(74) *Attorney, Agent, or Firm* — Tucker Ellis LLP

(57) ABSTRACT

A system for controlling a level of communication signals broadcast onto an associated power line communication (PLC) network by an associated transmitting device includes an input circuit, an adjustable amplifier circuit, and an output circuit. The input circuit receives a first communication signal having a first signal level from the associated transmitting device. The adjustable amplifier circuit applies a selectable gain to the first communication signal based on one or more of a monitored condition of the associated vehicle and/or a monitored condition of the associated PLC network to generate a level-adjusted communication signal having a second signal level different than the first signal level of the first communication signal. The output circuit receives the level-adjusted communication signal and broadcasts the level-adjusted communication signal onto the associated PLC network.

20 Claims, 15 Drawing Sheets

10 12 16 24 20 27 14₁ 18 26₁ 22₁ 26₂ 14₂ 22₂ 19 17

VARIABLE PLC ATTENUATOR AND AMPLIFIER

TECHNICAL FIELD

This disclosure relates to communications systems used in tractor-trailers. In particular, the disclosure relates to systems, methods, and computer readable medium for controlling levels of signals communicated between members of a tractor-trailer along a power line extending between the members.

BACKGROUND

Power line communication (PLC) carries data on a conductor that is also used simultaneously to deliver electric power. The communication data is encoded within a signal that is transmitted over the wires in frequency ranges outside of those used to transmit the electric power. PLC is advantageous relative to some other communication methods for reasons including because it enables communication using wiring that is typically provided in standard tractor-trailers. Such vehicle frequently employ (PLC) to exchange messages between members of the tractor-trailer including, for example, to exchange messages related to sensor readings from vehicle systems including anti-lock braking systems, collision avoidance systems, tire pressure monitoring systems and other vehicle systems that render or consume the readings, as well as commands used to control anti-lock braking systems, lighting systems and other vehicle systems that generate or respond to the commands.

Tractor-trailers that implement PLC typically employ transceivers to interface between the vehicle power line and microprocessors and other electronic control systems and/or control systems having processors therein used in the vehicle. One transceiver commonly used in the industry is a proprietary integrated circuit offered for sale by Qualcomm Atheros, Inc. under the name "SSC P485 PL Transceiver IC" that is intended to implement a communications protocol developed by the Society of Automotive Engineers (SAE) set forth in a document number J2497 and titled "Power Line Carrier Communications for Commercial Vehicles." Transceivers from other manufactures are also available. Sometimes also proprietary transceivers are used in certain vehicles.

One problem with PLC, however, is that the signal level broadcast onto the PLC network by devices using these various transceivers is sometimes inconsistent as between the diverse transceiver manufacturers and other sources. In particular, the signal level broadcast onto the PLC network may be excessively high. Although it is generally desirable for transmitting devices coupled with the PLC network to generate and broadcast onto the PLC network signals having sufficient energy levels for the other receiving devices on the PLC network to be able to receive and decode the signals with a high degree of fidelity, signals that have excessively high levels may generate electromagnetic radiation (EMR) from the PLC network at levels that are higher than permitted by regulatory authorities in various jurisdictions such as for example certain standards set in Europe. In addition, broadcasting signals that have excessively high levels onto the PLC network is wasteful and an inefficient use of energy.

Another problem with broadcasting signals that are excessively high onto the PLC network is that those signals may be vulnerable to nefarious eavesdropper equipment capable of detecting and interpreting the data encoded in the signals via EMR monitoring, electromotive force (EMF) monitoring, or the like.

Conversely, signals having low energy levels that are broadcast onto the PLC network may be attenuated by the PLC network itself, particularly when used in tractor-trailer systems having several members wherein the distances between the broadcasting devices and the receiving devices may be large such as for example up to about one hundred (100) feet. A signal broadcast from a transmitting device at one end of a long tractor-trailer might not be intelligible by a receiving device at the other end of the tractor-trailer because the signal is to weak.

In further addition to the above, it is important to be able to test devices that transmit onto the PLC network such as for purposes of verifying functionality of those devices. It is also important to be able troubleshoot those devices for protocol standards certification. It is further also important to verify the level of the signals transmitted by devices onto the PLC network, and the like.

In some further cases, nefarious hackers that are able to take control of the internal vehicle network such as for example the Controller Area Network (CAN) of the vehicle may be able to generate and transmit via the PLC network certain commands that may damage the vehicle or that may lead to bad results such as vehicle accidents or the like.

Accordingly there is a need for systems, methods, and computer readable mediums for controlling levels of signals communicated between members of a tractor-trailer along a power line extending between the members that will minimize and/or eliminate one or more of the above-identified deficiencies.

There is a further need for a system, method, and computer readable medium for controlling the levels of signals communicated between members of a tractor-trailer along a power line extending between the members to amplify and/or attenuate the PLC signal levels for maintenance, simulation, emission regulation, and/or any other purposes.

There is a further need for a system, method, and computer readable medium for controlling the levels of signals communicated between members of a tractor-trailer along a power line extending between the members based on one or more signals and/or other data received from a user via a user interface that will minimize and/or eliminate one or more of the above-identified deficiencies.

There is a further need for detecting irregular and/or unauthorized signals in one or more internal vehicle networks such as for example the Controller Area Network (CAN) and for preventing irregular and/or unauthorized commands resulting from the detected irregular and/or unauthorized signals from being broadcast onto the PLC network by attenuating the levels of signals communicated between members of a tractor-trailer along a power line extending between the members of the tractor-trailer.

There is yet a further need for a system, method, and computer readable medium for testing devices that transmit onto the PLC network.

BRIEF SUMMARY

This disclosure relates to communications systems used in tractor-trailers. In particular, the disclosure relates to systems, methods, and computer readable mediums for controlling the level of signals communicated between members of a tractor-trailer along a power line extending between the members.

Further in particular, the disclosure relates to systems, methods, and computer readable mediums for testing devices that transmit onto the PLC network.

Further in particular, the disclosure relates to systems, methods, and computer readable mediums for detecting irregular and/or unauthorized signals in one or more internal vehicle networks and for preventing irregular and/or unauthorized commands resulting from the detected irregular and/or unauthorized signals from being broadcast onto the PLC network by attenuating the levels of signals communicated between members of a tractor-trailer along a power line extending between the members of the tractor-trailer.

A system for testing and/or controlling communications between members of a tractor-trailer along a power line extending between the members in accordance with one embodiment includes an input circuit, an adjustable amplifier circuit operatively coupled with the input circuit, and an output circuit operatively coupled with the adjustable amplifier circuit. The input circuit is configured to receive a first communication signal from the associated transmitting devices, wherein the first communication signal has a first signal level. The adjustable amplifier circuit is configured to apply a selectable gain to the first communication signal to generate a level-adjusted communication signal having a second signal level different than the first signal level of the first communication signal. The output circuit is configured to receive the level-adjusted communication signal and to broadcast the level-adjusted communication signal onto the associated PLC network.

A method for testing and/or controlling communications between members of a tractor-trailer along a power line extending between the members is provided. A first communication signal is received from the associated transmitting device at step. The first communication signal is received by an input circuit of a system. The first communication signal has a first signal level. A selectable gain is applied to the first communication signal at step to generate a level-adjusted communication signal having a second signal level different than the first signal level of the first communication signal. In the example embodiment, the selectable gain is applied an adjustable amplifier circuit of the system, wherein the adjustable amplifier circuit is operatively coupled with the input circuit. The level-adjusted communication signal is broadcast onto the associated PLC network in step.

A system, method, and computer readable medium for controlling the signal level of communications between members of a tractor-trailer along a power line extending between the members in accordance the present teachings represent an improvement as compared to conventional systems and methods. In particular, the system, method, and computer readable medium disclosed herein enable control of the signal level of communications sent by transmitting devices along the power line so that the communications are not transmitted having excessive and/or insufficient signal levels.

Also in particular, the systems, methods, and computer readable mediums accordance the present teachings represent an improvement as compared to conventional systems and methods because the levels of the signals communicated between the members of the tractor-trailer along the power line may be amplify and/or attenuate for maintenance, simulation, emission regulation, and/or any other purposes.

Further in particular, the systems, methods, and computer readable mediums accordance the present teachings represent an improvement as compared to conventional systems and methods because a user interface is provided to receive user input for controlling the levels of the signals communicated between the members of the tractor-trailer along the power line to amplify and/or attenuate the PLC signals for maintenance, simulation, emission regulation, and/or any other purposes.

Still further in particular, the systems, methods, and computer readable mediums accordance the present teachings represent an improvement as compared to conventional systems and methods because a signal level control module is provided to for controlling the levels of the signals communicated between the members of the tractor-trailer along the power line to amplify and/or attenuate the PLC signals for maintenance, simulation, emission regulation, and/or any other purposes.

Still further in particular, the systems, methods, and computer readable mediums accordance the present teachings represent an improvement as compared to conventional systems and methods because input and output signal level detecting circuits are provided to for controlling the levels of the signals communicated between the members of the tractor-trailer along the power line to amplify and/or attenuate the PLC signals for maintenance, simulation, emission regulation, and/or any other purposes.

In accordance with an aspect, a system is provided for controlling a level of communication signals broadcast onto an associated power line communication (PLC) network by an associated transmitting device of an associated vehicle, wherein the system comprises an input circuit configured to receive a first communication signal from the associated transmitting device the first communication signal having a first signal level, an adjustable amplifier circuit operatively coupled with the input circuit the adjustable amplifier circuit being configured to apply a selectable gain to the first communication signal to generate a level-adjusted communication signal having a second signal level different than the first signal level of the first communication signal wherein the selectable gain is based on one or more of a monitored condition of the associated vehicle and/or a monitored condition of the associated PLC network, and an output circuit operatively coupled with the adjustable amplifier circuit the output circuit being configured to receive the level-adjusted communication signal and to broadcast the level-adjusted communication signal onto the associated PLC network.

In any of the embodiments of the system, the adjustable amplifier circuit comprises an adjustable attenuation circuit configured to apply a selectable fractional gain to the first communication signal to generate an attenuated communication signal having the second signal level, wherein the second signal level of the attenuated communication signal is less than the first signal level of the first communication signal, and the output circuit is configured to receive the attenuated communication signal and to broadcast the attenuated communication signal 405 onto the associated PLC network.

In any of the embodiments of the system, the adjustable attenuation circuit comprises a first resister having a first resistance value, and a second resister having a selectable resistance value, wherein the selectable fractional gain comprises a relationship between the first resistance value of the first resister and the selectable resistance value of the second resister.

In any of the embodiments of the system, the system further comprises a signal level control module operatively coupled with the adjustable attenuation circuit. The signal level control module comprises a memory device, a processor operatively coupled with the memory device, level set point data stored in the memory device the level set point data being representative of a desired communication signal level, signal level control logic stored in the memory device the signal level control logic being executable by the processor to determine attenuation command data to set the fractional gain to control the second signal level of the attenuated communication signal to have the desired communication signal level, and a control module output circuit operatively coupled with the memory device and the processor the control module output circuit being operable to generate an attenuation command signal based on the determined attenuation command data, wherein the adjustable attenuation circuit is responsive to the attenuation command signal to apply the selectable fractional gain to the first communication signal to generate the attenuated communication signal having the desired communication signal level.

In any of the embodiments of the system, the system further comprises an input signal level detecting circuit operatively coupled with the signal level control module the input signal level detecting circuit detecting as the monitored condition of the associated PLC network the first signal level of the first communication signal, wherein the signal level control logic is executable by the processor to determine the attenuation command data based on the first signal level of the first communication signal detected by the input signal level detecting circuit to set the fractional gain to control the second signal level of the attenuated communication signal to have the desired communication signal level.

In any of the embodiments of the system, the system further comprises an output signal level detecting circuit operatively coupled with the signal level control module the output signal level detecting circuit detecting as the monitored condition of the associated PLC network the second signal level of the attenuated communication signal, wherein the signal level control logic is executable by the processor to determine the attenuation command data based on the second signal level of the attenuated communication signal detected by the output signal level detecting circuit to set the fractional gain to control the second signal level of the attenuated communication signal to have the desired communication signal level.

In any of the embodiments of the system, the system further comprises a user interface circuit operatively coupled with the signal level control module the user interface circuit being operative to receive a level set point signal from an associated user of the system, convert the level set point signal received from the associated user to the level set point data, and communicate the level set point data to the signal level control module for storage in the memory device.

In any of the embodiments of the system, the system further comprises a network interface circuit operatively coupled with the signal level control module, wherein the processor is operable to execute the signal level control logic stored in the memory device to determine as the monitored condition of the associated vehicle an unauthorized access to the associated transmitting device of the associated vehicle via the network interface circuit, wherein the signal level control logic is executable by the processor to determine the attenuation command data based on the determined unauthorized access to the associated transmitting device of the associated vehicle to set the fractional gain to control the second signal level of the attenuated communication signal to have the desired communication signal level.

In any of the embodiments of the system, the network interface circuit comprises one or more of an automotive communication interface, an automotive Ethernet interface, a Controller Area Network (CAN) interface, and/or a Joint Test Action Group (JTAG) interface operatively coupled with the signal level control module, and the processor is operable to execute the signal level control logic stored in the memory device to determine as the monitored condition of the associated vehicle the unauthorized access to the associated transmitting device of the associated vehicle via the one or more of the automotive Ethernet, CAN, and/or JTAG interfaces to set the fractional gain to control the second signal level of the attenuated communication signal to have the desired communication signal level.

In any of the embodiments of the system, the network interface circuit comprises a wireless network interface circuit operatively coupled with the signal level control module, wherein the network interface circuit is operable to wirelessly receive an unauthorized access signal representative of the unauthorized access to the associated transmitting device of the associated vehicle, and wherein the processor is operable to execute the signal level control logic stored in the memory device to determine based on the unauthorized access signal received by the wireless network interface circuit as the monitored condition of the associated vehicle the unauthorized access to the associated transmitting device of the associated vehicle to set the fractional gain to control the second signal level of the attenuated communication signal to have the desired communication signal level.

In accordance with a further aspect, a method is provided for controlling a level of communication signals broadcast onto an associated power line communication (PLC) network by an associated transmitting device of an associated vehicle, wherein the method comprises receiving a first communication signal from the associated transmitting device the first communication signal having a first signal level, applying a selectable fractional gain to the first communication signal to generate an attenuated communication signal having a second signal level less than the first signal level of the first communication signal wherein the selectable gain is based on one or more of a monitored condition of the associated vehicle and/or a monitored condition of the associated PLC network, and broadcasting the attenuated communication signal onto the associated PLC network.

In any of the embodiments of the method, the method further comprises storing level set point data in a memory device of a signal level control module the level set point data being representative of a desired communication signal level, executing signal level control logic stored in the memory device by a processor of the signal level control module to determine attenuation command data to set the fractional gain to control the second signal level of the attenuated communication signal to have the desired communication signal level, generating by a control module output circuit of the signal level control module an attenuation command signal based on the determined attenuation command data, and applying the selectable fractional gain to the first communication signal by an adjustable attenuation circuit of the signal level control module to generate the attenuated communication signal having the desired communication signal level.

In any of the embodiments of the method, the method further comprises detecting as the monitored condition of the associated PLC network the first signal level of the first communication signal, and determining the attenuation command data based on the detected first signal level of the first communication signal to set the fractional gain to control the second signal level of the attenuated communication signal to have the desired communication signal level.

In any of the embodiments of the method, the method further comprises detecting as the monitored condition of the associated PLC network the second signal level of the attenuated communication signal, and determining the attenuation command data based on the detected second signal level of the attenuated communication signal to set the fractional gain to control the second signal level of the attenuated communication signal to have the desired communication signal level.

In any of the embodiments of the method, the method further comprises receiving via a user interface circuit of the signal level control module a level set point signal from an associated user, converting the level set point signal received from the associated user to the level set point data, and communicating the level set point data to the signal level control module for storage in the memory device.

In any of the embodiments of the method, the method further comprises executing the signal level control logic by the processor of the signal level control module to determine as the monitored condition of the associated vehicle an unauthorized access to the associated transmitting device of the associated vehicle via a network interface circuit, and executing the signal level control logic by the processor to determine the attenuation command data based on the determined unauthorized access to the associated transmitting device of the associated vehicle to set the fractional gain to control the second signal level of the attenuated communication signal to have the desired communication signal level.

In any of the embodiments of the method, the executing the signal level control logic to determine the unauthorized access to the associated transmitting device of the associated vehicle comprises determining the unauthorized access to the associated transmitting device of the associated vehicle via one or more of an automotive Ethernet interface, a Controller Area Network (CAN) interface, and/or a Joint Test Action Group (JTAG) interface operatively coupled with the signal level control module.

In any of the embodiments of the method, the executing the signal level control logic to determine the unauthorized access to the associated transmitting device of the associated vehicle comprises wirelessly receiving an unauthorized access signal representative of the unauthorized access to the associated transmitting device.

In accordance with a further aspect, a non-transitory computer-readable medium storing instructions is provided that, when the stored instructions are executed by a computer, cause the computer to perform the method as described above for controlling a level of communication signals broadcast onto an associated power line communication (PLC) network by an associated transmitting device of an associated vehicle.

The foregoing and other aspects, features, details, utilities, and advantages of the present invention will be apparent from reading the following description and claims, and from reviewing the accompanying drawings.

DETAILED DESCRIPTION

Figure 1:
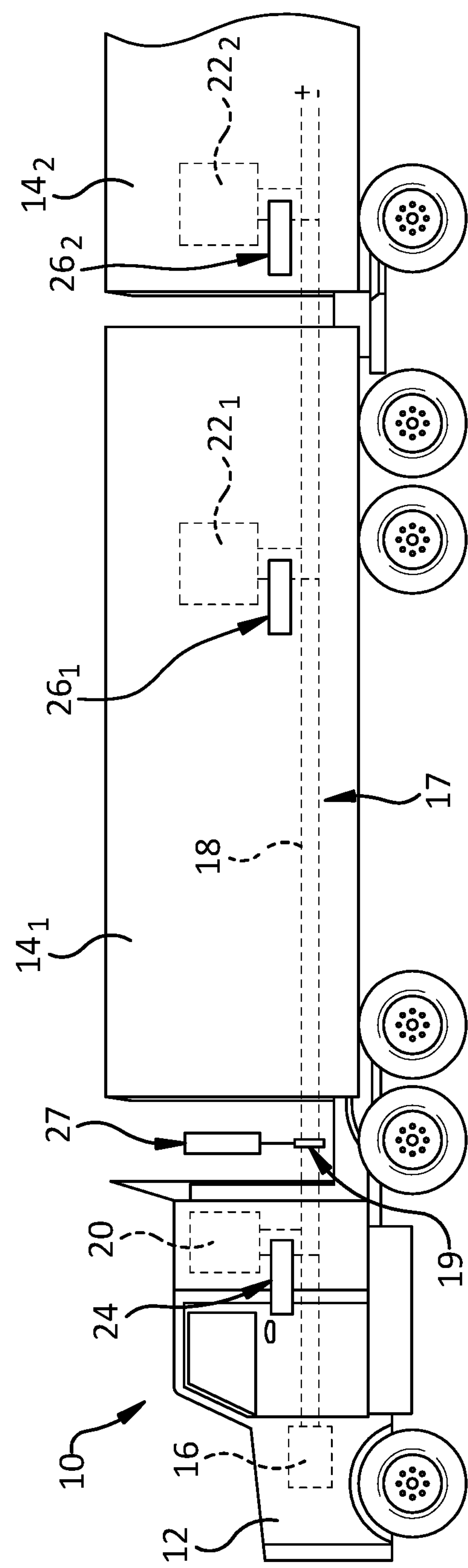
FIG. 1 is a diagrammatic view of a vehicle including systems for testing and controlling a level of communications between members of a tractor-trailer along a power line extending between the members in accordance with one embodiment of the present teachings.

Referring now to the drawings wherein like reference numerals are used to identify like components in the various views, FIG. 1 illustrates a tractor-trailer 10 including systems for testing and controlling a level of communications between members of a tractor-trailer along a power line extending between the members in accordance with an example embodiment of the present teachings. Tractor-trailer 10 (also referred to as a semi) contains a truck or tractor 12 and one or more trailers $\mathbf{14}_1 \ldots \mathbf{14}_N$. Tractor 12 contains a power unit, such as an internal combustion engine, and steering and drive axles. Tractor 12 also contains a battery 16 for use in starting the power unit and in providing power to various accessory systems. Trailers $14_1 \ldots 14_N$ are provided to store and/or otherwise carry freight and are detachably coupled to tractor 12. Although a pair of trailers 14 are shown in the illustrated embodiment, it should be understood that the number of trailers 14 attached to tractor 12 may vary.

Tractor 12 and trailers $14_1 \ldots 14_N$ may include various fluid and power lines (not shown) that extend between tractor 12 and trailers $14_1 \ldots 14_N$ such as for example a wiring harness 17 including a power line 18. The fluid and power lines allow delivery of fluids and electrical power from tractor 12 to the trailers $14_1 \ldots 14_N$ for use in, for example, tire pressure management, braking, and activation of tail lights on the trailers $14_1 \ldots 14_N$. Power line 18 also forms part of a network used to transmit communications between various electronic control units (ECUs) or electronic control systems 20, $22_1 \ldots 22_N$ on tractor 12 and trailers $14_1 \ldots 14_N$, respectively. Electronic control systems 20, $22_1 \ldots 22_N$ may comprise any of a wide variety of systems commonly employed on tractor-trailer 10 including, for example, anti-lock braking systems, collision avoidance systems, tire pressure monitoring and control systems, trailer load monitoring systems, and lighting systems. Power line 18 may enable transmission of commands and/or data from one or more of the electronic control systems $22_1 \ldots 22_N$ on trailers $14_1 \ldots 14_N$ to a system 20 on tractor 12 including, for example, sensor readings indicative of the operation of an anti-lock braking system, the location of surrounding vehicles and infrastructure, pressure within the tires on a trailer 14, or a shift in the load carried by a trailer 14. Power line 18 may also enable transmission of commands and/or data from tractor 12 to trailers $14_1 \ldots 14_N$ for use in controlling elements of an anti-lock braking system, tire pressure control system or lighting system on one or more of trailers $14_1 \ldots 14_N$. In further addition, power line 18 may also enable transmission of commands and/or data from any one or more of the trailers $14_1 \ldots 14_N$ to any other one or more of the trailers $14_1 \ldots 14_N$ for any use as may be necessary and/or desired. That is, the power line 18 is used in the present teachings as a PLC network.

Although the various electronic control units (ECUs) or electronic control systems 20, $22_1 \ldots 22_N$ on the tractor 12 and the trailers $14_1 \ldots 14_N$ may communicate with each other using certain networks of the tractor trailer 10 such as for example by using the CAN of the vehicle 10, wireless communication, or by other systems or technologies, the power line 18 may also form part of a communication network used to transmit commands and/or data between the various electronic control units (ECUs) or electronic control systems 20, $22_1 \ldots 22_N$ on the tractor 12 and the trailers $14_1 \ldots 14_N$, respectively. In particular, the communication network is used to transmit commands and/or data between the various electronic control units (ECUs) or electronic control systems 20, $22_1 \ldots 22_N$ on the tractor 12 and the trailers $14_1 \ldots 14_N$ via one or more intervening signal level control systems 24, $26_1 \ldots 26_N$ on tractor 12 and trailers $14_1 \ldots 14_N$, respectively. The signal level control systems 24, $26_1 \ldots 26_N$ provide signal level control.

In the example shown, the signal level control system 24 is disposed between the electronic control system 20 on the tractor 12 and the PLC communications network comprising the power line 18. In this way, the level of the PLC signal attempted to be broadcast by the electronic control system 20 of the tractor 12 onto the PLC network and in particular onto the power line 18 can be intercepted by the signal level control system 24, and controlled by the signal level control system 24 to conform to a selected level before it is delivered onto the power line 18 by the signal level control system 24. Also in the example shown, by the signal level control system 24 being disposed between the electronic control system 20 on the tractor 12 and the PLC communications network comprising the power line 18, the level of the PLC signal attempted to be delivered from the PLC network to the electronic control system 20 of the tractor 12 can be intercepted by the signal level control system 24, and controlled by the signal level control system 24 to conform to a selected level before it is delivered onto the power line 18 by the signal level control system 24.

The signal level control system 24 may amplify and/or attenuate the PLC signal levels for maintenance, simulation, emission regulation, security reasons, and/or any other purposes. In an example embodiment, input and output signal level detecting circuits may be provided in the signal level control system 24 for controlling the levels of the signals communicated between the members of the tractor-trailer along the power line 18 to comport to a desired communication signal level for maintenance, simulation, emission regulation, and/or any other purposes. In an example embodiment, a user interface may be provided in the signal level control system 24 for receiving user input for controlling the levels of the signals communicated between the members of the tractor-trailer along the power line 18 to comport to a desired communication signal level for maintenance, simulation, emission regulation, security reasons, and/or any other purposes. In an example embodiment, a control interface may be provided in the signal level control system 24 for determining and/or otherwise detecting irregular and/or unauthorized signals in one or more internal vehicle networks and for preventing irregular and/or unauthorized commands resulting from the detected irregular and/or unauthorized signals from being broadcast onto the PLC network by controlling the levels of the signals communicated between the members of the tractor-trailer along the power line 18 to comport to a desired attenuated communication signal level for security reasons.

Similarly in the example shown in FIG. 1, the one or more signal level control systems $26_1 \ldots 26_N$ are disposed between the electronic control systems $22_1 \ldots 22_N$ on the trailers $14_1 \ldots 14_N$ and the PLC communications network comprising the power line 18. In this way, the level of the PLC signal attempted to be broadcast by the electronic control systems $22_1 \ldots 22_N$ on the trailers $14_1 \ldots 14_N$ onto the PLC network and in particular onto the power line 18 can be intercepted by the signal level control systems $26_1 \ldots 26_N$, and controlled by the signal level control systems $26_1 \ldots 26_N$ to conform to a selected level before it is delivered onto the power line 18 by the respective signal level control systems $26_1 \ldots 26_N$. The signal level control systems $26_1 \ldots 26_N$ may amplify and/or attenuate the PLC signal levels for maintenance, simulation, emission regulation, security reasons, and/or any other purposes. In an example embodiment, input and output signal level detecting circuits may be provided in one or more of the signal level control systems $26_1 \ldots 26_N$ for controlling the levels of the signals communicated between the members $22_1 \ldots 22_N$ of the tractor-trailer along the power line 18 to comport to a desired communication signal level for maintenance, simulation, emission regulation, security reasons, and/or any other purposes. In an example embodiment, a user interface may be provided in one or more of the signal level control systems $26_1 \ldots 26_N$ for receiving user input for controlling the levels of the signals communicated between the members $22_1 \ldots 22_N$ of the tractor-trailer along the power line 18 to comport to a desired communication signal level for maintenance, simulation, emission regulation, and/or any other purposes. In an example embodiment, a control interface may be provided in the signal level control systems 24, 26$_1$ . . . 26$_N$ for determining and/or otherwise detecting irregular and/or unauthorized signals in one or more internal vehicle networks and for preventing irregular and/or unauthorized commands resulting from the detected irregular and/or unauthorized signals from being broadcast onto the PLC network by controlling the levels of the signals communicated between the members of the tractor-trailer along the power line 18 to comport to a desired attenuated communication signal level for security reasons.

In addition to the above, a signal level test system 27 is provided. The signal level test system 27 may be used to test the level of signals broadcast by the various equipment on the power line 18. In particular, the signal level test system 27 may be selectively coupled with the power line 18 at a connection point 19 of the wiring harness 17.

Figure 2:
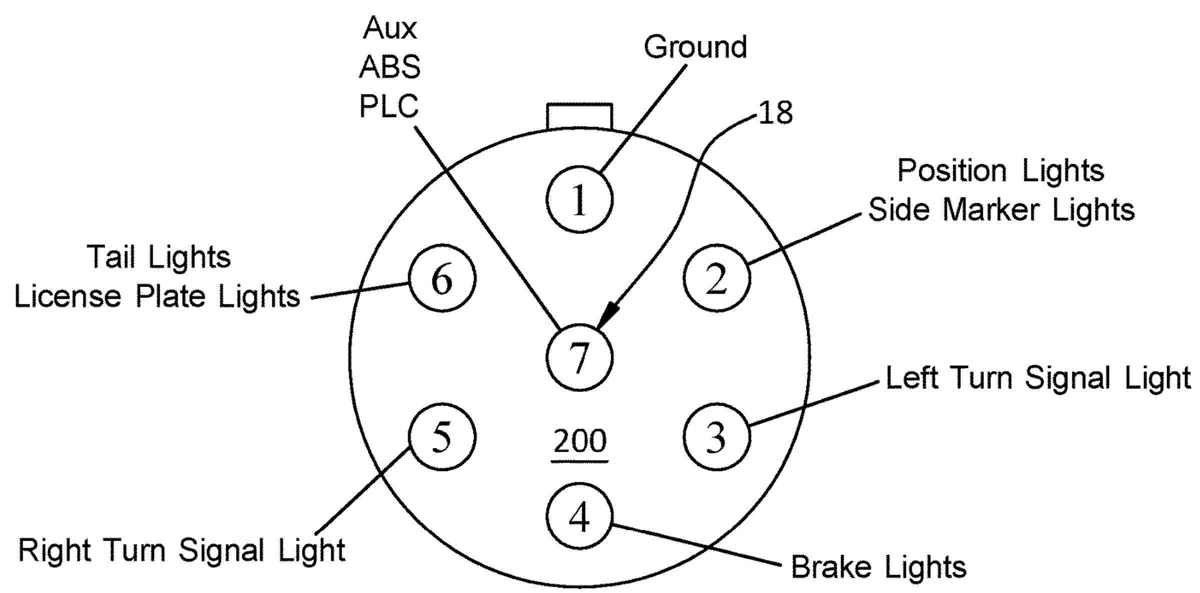
FIG. 2 is a pinout of an example commercial vehicle wiring harness that connects components of the vehicle in accordance with an embodiment of the subject disclosure.

The electronic control systems 20, 22$_1$ . . . 22$_N$ may be communicably coupled with one another via the intervening one or more signal level control systems 24, 26$_1$ . . . 26$_N$ using the trailer wiring harness 17 spanning between the one or more signal level control systems 24, 26$_1$ . . . 26$_N$. In an embodiment, the trailer wiring harness may connect one or more of the electronic control systems 20, 22$_1$ . . . 22$_N$ via the one or more signal level control systems 24, 26$_1$ . . . 26$_N$ using one or more of seven (7) conductors, as shown in an example pinout 200 of FIG. 2. Each of the conductors may be allocated to a unique vehicle function of the commercial vehicle 10. In an embodiment, a first conductor may provide a vehicle ground, a second conductor may be connected to one or more position lights and/or side marker lights, a third conductor may be connected to one or more left turn signal lights, a fourth conductor may be connected to one or more brake lights, a fifth conductor may be connected to one or more right turn signal lights, a sixth conductor may be connected to one or more tail lights and/or license plate lights, and a seventh conductor 18 may be connected to provide auxiliary power, to transmit an anti-lock braking system (ABS) communication signal from one or more antilock brake system(s) of one or more trailer(s), and on which power-line communications (PLC) may be exchanged.

In an example embodiment, the one or more signal level control systems 24, 26$_1$ . . . 26$_N$ may be mutually communicably coupled with one another via the trailer wiring harness 17 spanning between the one or more signal level control systems 24, 26$_1$ . . . 26$_N$. In an example embodiment, the one or more signal level control systems 24, 26$_1$ . . . 26$_N$ may be mutually communicably coupled with one another via another network such as for example a wireless communication network having a range that spans the tractor 12 and the trailers 14$_1$ . . . 14$_N$ of the commercial vehicle 10. In these ways, irregular and/or unauthorized signals detected by any one or more of the signal level control systems 24, 26$_1$ . . . 26$_N$ in or on the ECUs or electronic control systems 20, 22$_1$ . . . 22$_N$ on the tractor 12 and the trailers 14$_1$ . . . 14$_N$ may be communicated to other one or more of the signal level control systems 24, 26$_1$ . . . 26$_N$ for preventing irregular and/or unauthorized commands resulting from the detected irregular and/or unauthorized signals from being broadcast onto the PLC network by controlling the levels of the signals communicated between the members of the tractor-trailer along the power line 18 to comport to a desired attenuated communication signal level for security reasons.

The commercial vehicle 10 may operate on a variety of voltages, such as 12 VDC, 24 VDC, or other voltages, such as voltages that may be present in an electric vehicle or hybrid vehicle, for example. The power provided via the seventh conductor 18 may be in the form of a DC voltage that becomes switched to the seventh conductor when a vehicle key is switched to an "accessory" or "ON" position, a start button is pressed, the commercial vehicle 10 is started or activated, and/or the like. In an embodiment, the seventh conductor 18, when switched on, may provide a voltage approximately equivalent to the voltage of one or more batteries of the commercial vehicle 10 (e.g., 12 VDC, 24 VDC).

In an example where the commercial vehicle 10 includes an internal combustion engine, the seventh conductor 18 may become switched to provide a DC voltage when the internal combustion engine is started and/or when an "ignition conductor" is activated that enables power to be delivered to the ignition coils, fuel pump, various vehicle sensors, and the like, to become powered. In some commercial vehicles 10, the "ignition conductor," may become activated both when the vehicle is turned ON, the engine is started, and/or a vehicle key is turned to an "ON" position. In electric vehicles, where there may be no true "ignition," an analogous conductor and/or associated accessory circuit may become powered in response to the vehicle being turned on, activated, or awoke from a sleep, hibernate, or suspend state, such as when a driver indicates his or her intent to use the vehicle by unlocking the door(s), moving to within a proximity of the vehicle, transmitting a signal to activate the vehicle via a smartphone or key fob, opening a door or compartment of the commercial vehicle 100, and/or the like.

The PLC communications that may be carried out on the seventh conductor 18 may be used to communicate the ABS communication signal previously described as well as maintenance, fault, diagnostic, and other information. This information may be transmitted from any one or more of the trailer electronic control systems 22$_1$ . . . 22$_N$ via the intervening one or more signal level control systems 26$_1$ . . . 26$_N$ to the tractor electronic control system 20, which may respond by alerting a driver of the tractor with a dashboard illumination indication, electronic display indication, LED or other lamp or warning illumination, smartphone alert, playing a sound, and/or other audio or visual indications. The PLC communications that may be carried out on the seventh conductor 18 may also be used to communicate signals from the tractor electronic control system 20 via the intervening signal level control system 24 to any one or more of the trailer electronic control systems 22$_1$ . . . 22$_N$.

As shown in FIG. 1, a signal level control system 24 in accordance with an example embodiment is disposed between the tractor electronic control system 20 and the wiring harness 17 and, in particular, between the tractor electronic control system 20 and the seventh conductor 18 in accordance with the example. The system 24 is provided for controlling a level of communication signals broadcast onto the power line communication (PLC) network by an associated transmitting device such as for example by the tractor electronic control system 20, and for also controlling the level of communication signals delivered from the power line communication (PLC) network to an associated receiving device such as for example the tractor electronic control system 20 when receiving signals and data from the PLC. Similarly, further signal level control systems 26$_1$ . . . 26$_N$ are provided between the one or more trailer electronic control systems 22$_1$ . . . 22$_N$ and the wiring harness 17 and, in particular, between the one or more trailer electronic control systems 22$_1$ . . . 22$_N$ and the seventh conductor 18 in accordance with the example. The systems 26$_1$ . . . 26$_N$ are provided for controlling a level of communication signals broadcast onto the power line communication (PLC) network by associated transmitting devices such as for example by the one or more trailer electronic control systems 22$_1$ . . . 22$_N$, and for also controlling the level of communication signals delivered from the power line communication (PLC) network to associated receiving devices such as for example the one or more trailer electronic control systems 22$_1$ . . . 22$_N$ when the one or more trailer electronic control systems 22$_1$ . . . 22$_N$ are operational to receive signals and data from the PLC.

Figure 3:
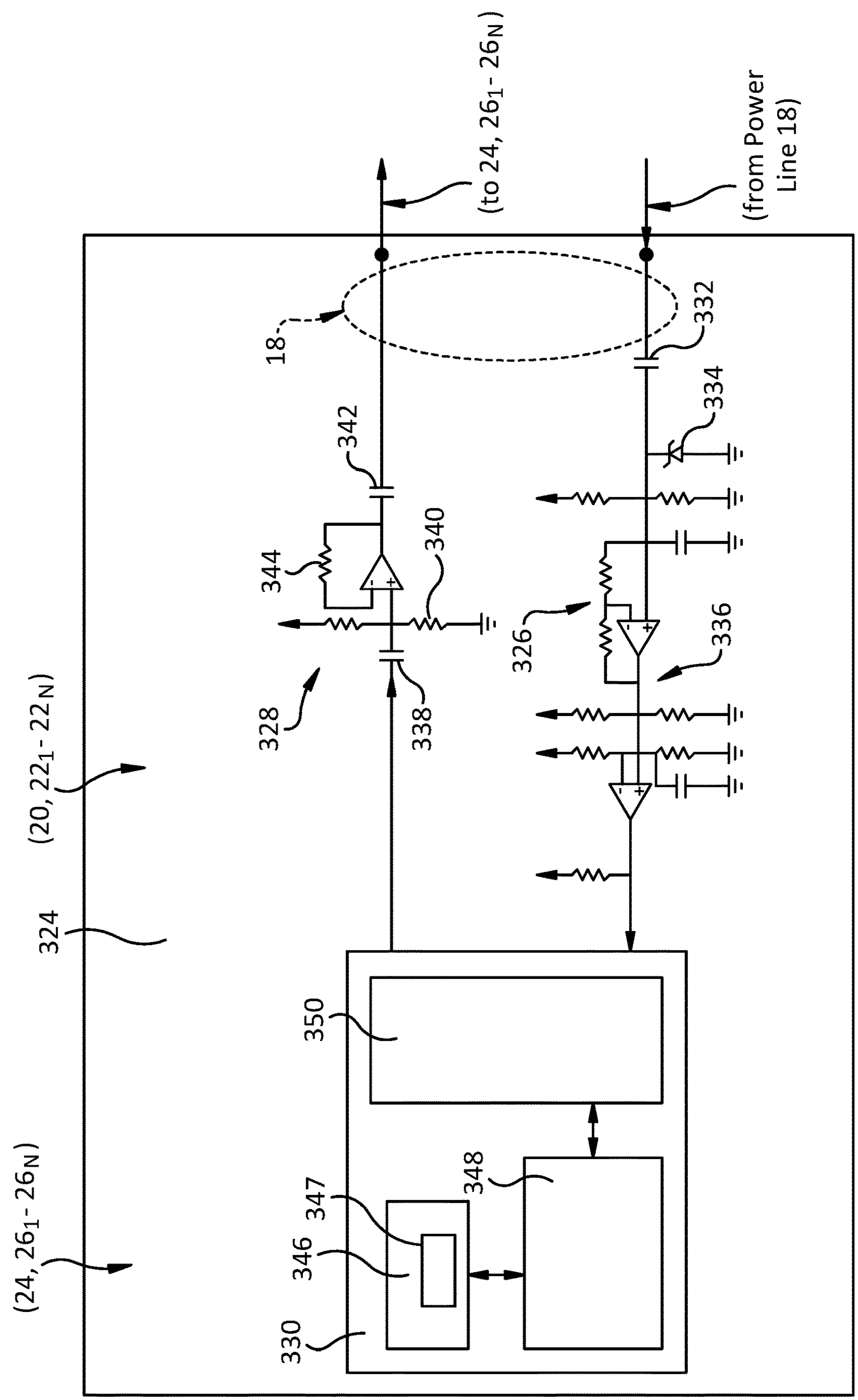
FIG. 3 is a diagrammatic and schematic view of an electronic control unit (ECU) or electronic control system including a signal level control system in accordance with an embodiment of the present teachings receiving and/or broadcasting signals relative to a PLC network between members of a tractor-trailer along a power line extending between the members in accordance with an embodiment of the present teachings.

Referring now to FIG. 3, each of the vehicle ECUs or systems 20, 22$_1$ . . . 22$_N$ may include a system 324 for controlling communications between members of tractor-trailer 10 (e.g., between a tractor 12 and a trailer 14 or between multiple trailers 14$_1$ . . . 14$_N$) along the power line 18 and, in accordance with an embodiment herein may include embedded or integrated functionality for adjusting the gain of the signals such as for example to attenuate the signals in accordance with the teachings herein. That is, in accordance with an example embodiment, the vehicle ECUs or systems 20, 22$_1$ . . . 22$_N$ may include the signal level control systems 24, 26$_1$ . . . 26$_N$ embedded or otherwise formed or provided therein as an integrated package such as for example by storing signal level control logic and executing the signal level control logic by a processor. System 324 may include an input signal conditioning circuit 326, an output signal conditioning circuit 328 and a controller 330.

Input signal conditioning circuit 326 is provided to condition signals received from power line 18 for use by controller 330. Circuit 326 includes a capacitor 332 that couples circuit 326 to power line 18 and a clamping diode downstream of the capacitor 332 including a Zener diode 334. It should be understood that inductive coupling could be used instead of capacitive coupling. Circuit 326 further includes an amplifier and conditioning stage 336 that is configured to convert the analog signal from power line 18 into a digital input signal to controller 330. In accordance with one embodiment, the digital input signal comprises a pulse-width modulated square wave signal.

Output signal conditioning circuit 328 is provided to condition signals output by controller 330 for transmission on power line 18. Circuit 328 includes a coupling capacitor 338 and biasing circuit 340 for signals received from controller 330. Circuit 328 also includes a capacitor 342 that couples circuit 328 to power line 18. It should again be understood that inductive coupling could be used instead of capacitive coupling. Circuit 328 further includes an amplifier and conditioning stage 344 that converts a digital output signal output by controller 330 into an analog output signal for use on power line 18. In accordance with one embodiment, the digital output signal output by controller 330 is a pulse width modulated square wave signal.

Controller 330 provides functions including a function to decode messages received from power line 18 and a function to encode messages for transmission on power line 18. Controller 330 provides a further function of detecting irregular and/or unauthorized signals in or on the ECUs or electronic control systems 20, 22$_1$ . . . 22$_N$ on the tractor 12 and the trailers 14$_1$ . . . 14$_N$ to the extent that those electronic control systems are separately formed, and of controlling the levels of the signals communicated between the members of the tractor-trailer along the power line 18 for preventing irregular and/or unauthorized commands resulting from the detected irregular and/or unauthorized signals from being broadcast onto the PLC network by the compromised ECUs 20, 22$_1$ . . . 22$_N$. Controller 330 may comprise a programmable microprocessor or microcontroller or may comprise an application specific integrated circuit (ASIC). Controller 330 may include a memory 346 and a central processing unit (CPU) 348. The CPU 348 of the controller 330 may execute logic 347 stored in the memory device 346 to perform functions including for example a function to decode messages received from power line 18, a function to encode messages for transmission on power line 18, a function of detecting irregular and/or unauthorized signals in or on the ECUs or electronic control systems 20, 22$_1$ . . . 22$_N$ on the tractor 12 and the trailers 14$_1$ . . . 14$_N$, and a function of controlling the levels of the signals communicated between the members of the tractor-trailer along the power line 18 for preventing irregular and/or unauthorized commands resulting from the detected irregular and/or unauthorized signals from being broadcast onto the PLC network by the compromised ECUs 20, 22$_1$ . . . 22$_N$.

Controller 330 may also include an input/output (I/O) interface 350 including a plurality of input/output pins or terminals through which controller 330 may receive a plurality of input signals and transmit a plurality of output signals. The input signals may include signals received from input signal conditioning circuit 326 while the output signals may include signals transmitted to output signal conditioning circuit 328. In the illustrated embodiment, a single controller 330 is shown. It should be understood, however, that the functionality of controller 330 described herein may be divided among multiple sub-controllers. In one embodiment, controller 330 comprises a microcontroller offered for sale by Infineon Technologies AG under the trademark "AURIX" and having model number TC26x. It should be understood, however, that other vehicle microcontrollers may alternatively be used. In accordance with the present teachings, controller 330 may be configured with appropriate programming instructions (i.e., software or a computer program) to implement several steps in a method for controlling communications between tractor 12 and trailers 14$_1$ . . . 14$_N$ along power line 18 described below.

Figure 4:
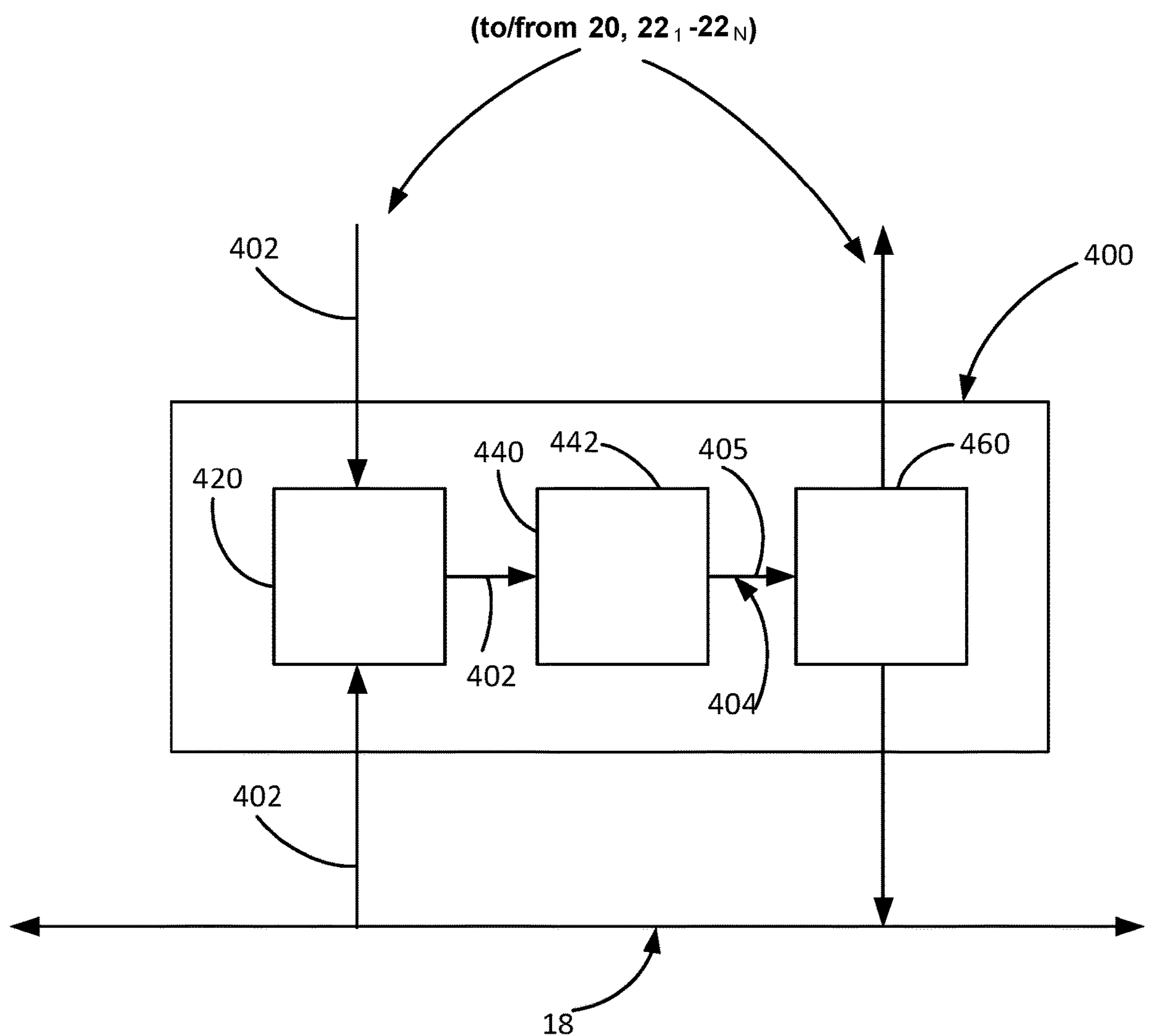
FIG. 4 is a diagrammatic and schematic view of a signal level control system in accordance with an embodiment of the present teachings.

Referring now to FIG. 4, each of the signal level control systems 24, 26$_1$ . . . 26$_N$ on tractor 12 and trailers 14$_1$ . . . 14$_N$ may include a system 400 such as shown in the Figure in block functional form for controlling a level of communication signals broadcast onto an associated power line communication (PLC) network by an associated transmitting device such as for example, by the one or more of electronic control systems 20, 22$_1$ . . . 22$_N$ on the tractor 12 and trailers 14$_1$ . . . 14$_N$. The system 400 also functions to detect irregular and/or unauthorized signals in or on the ECUs or electronic control systems 20, 22$_1$ . . . 22$_N$ on the tractor 12 and the trailers 14$_1$ . . . 14$_N$, and to control the levels of the signals communicated between the members of the tractor-trailer along the power line 18 for preventing irregular and/or unauthorized commands resulting from the detected irregular and/or unauthorized signals from being broadcast onto the PLC network by the compromised ECUs 20, 22$_1$ . . . 22$_N$. In the example embodiment, the system 400 includes an input circuit 420, an adjustable amplifier circuit 440 operatively coupled with the input circuit 420, and an output circuit 460 operatively coupled with the adjustable amplifier circuit 440. In the example embodiment, the input circuit 420 is configured to receive a first communication signal 402 from the power line 18 and/or from an associated transmitting device such as for example, from the electronic control system 20 on the tractor 12 or from any one or more of electronic control systems $22_1 \ldots 22_N$ on the trailers $14_1 \ldots 14_N$. The first communication signal 402 may have a first signal level.

Also in accordance with the example embodiment, the adjustable amplifier circuit 440 is configured to apply a selectable gain to the first communication signal 402 to generate a level-adjusted communication signal 404 having a second signal level different than the first signal level of the first communication signal 402. In accordance with an example embodiment, the selectable gain may amplify the first communication signal 402; that is, apply a gain greater than unity or one (gain >1.0). In accordance with an example embodiment, the selectable gain may attenuate the first communication signal 402; that is, apply a gain of less than unity or one (gain <1.0).

Still further in accordance with the example embodiment, the output circuit 460 is configured to receive the level-adjusted communication signal 404 and to broadcast the level-adjusted communication signal 404 onto the associated PLC network via the power line 18.

In a particular example embodiment, the adjustable amplifier circuit 440 may comprise an adjustable attenuation circuit 442 configured to apply a selectable fractional gain to the first communication signal 402 to generate an attenuated communication signal 405 having the second signal level, wherein the second signal level of the attenuated communication signal 405 is less than the first signal level of the first communication signal 402. In the embodiment the adjustable attenuation circuit 442 applies a selectable fractional gain to the first communication signal 402, wherein the selectable fractional gain is less than unity or one (gain <1.0). The output circuit 460 is configured to receive the attenuated communication signal 405 and to broadcast the attenuated communication signal 405 onto the associated PLC network via the power line 18.

It is to be appreciated that the functional blocks shown in FIG. 4 are replicated in the signal level control system 24 of an example embodiment disposed between the electronic control system 20 on the tractor 12 and the PLC communications network for attenuating signals to be delivered from the power line 18 to the signal level control system 24 of the example embodiment for signals flowing from the power line 18 to the signal level control system 24 on the tractor 12 via the signal level control system 24. In that way, the detection of irregular and/or unauthorized signals in or on the ECUs $22_1 \ldots 22_N$ on trailers $14_1 \ldots 14_N$ can be used to trigger attenuation of signals to be delivered to the electronic control system 20 on the tractor 12 thereby preventing any mal-signals from being delivered to the electronic control system 20 on the tractor 12 that might be the result of the detected irregular and/or unauthorized signals in or on the ECUs $22_1 \ldots 22_N$ on trailers $14_1 \ldots 14_N$.

Similarly, it is to be appreciated that the functional blocks shown in FIG. 4 are replicated in the one or more signal level control systems $26_1 \ldots 26_N$ on the trailers $14_1 \ldots 14_N$ of an example embodiment disposed between the electronic control systems $22_1 \ldots 22_N$ on the trailers $14_1 \ldots 14_N$ and the PLC communications network for attenuating signals to be delivered from the power line 18 to the one or more of electronic control systems $22_1 \ldots 22_N$ on the trailers $14_1 \ldots 14_N$ via the electronic control systems $22_1 \ldots 22_N$ on the trailers $14_1 \ldots 14_N$. In that way, the detection of irregular and/or unauthorized signals in or on the electronic control system 20 on the tractor 12 can be used to trigger attenuation of signals to be delivered to the electronic control system $22_1 \ldots 22_N$ on the trailers $14_1 \ldots 14_N$ thereby preventing any mal-signals from being delivered to the electronic control system $22_1 \ldots 22_N$ on the trailers $14_1 \ldots 14_N$ that might be the result of the detected irregular and/or unauthorized signals in or on the electronic control system 20 on the tractor 12.

It is to be appreciated that the system 400 of FIG. 4 may be incorporated or otherwise provided within any of the electronic control systems $22_1 \ldots 22_N$ on the trailers $14_1 \ldots 14_N$ and/or on the electronic control system 20 on the tractor 12. That is, the system 400 may be integrated within any of the electronic control systems $22_1 \ldots 22_N$ on the trailers $14_1 \ldots 14_N$ and/or on the electronic control system 20 on the tractor 12 as a unitary package such as logic 347 stored on a computer readable medium 346, wherein the logic 347 is executable by a processor 348 of the electronic control systems 20, $22_1 \ldots 22_N$ to perform the functions described herein. In that way, the detection of irregular and/or unauthorized signals can be detected directly by the electronic control systems 20, $22_1 \ldots 22_N$ themselves which can be used to trigger attenuation of signals to be communicated between the electronic control systems 20, $22_1 \ldots 22_N$ and the power line 18, thereby preventing any mal-signals from being delivered to the other electronic control systems 20, $22_1 \ldots 22_N$ that might be the result of the detected irregular and/or unauthorized signals in or on one of the electronic control systems 20, $22_1 \ldots 22_N$.

Figure 5:
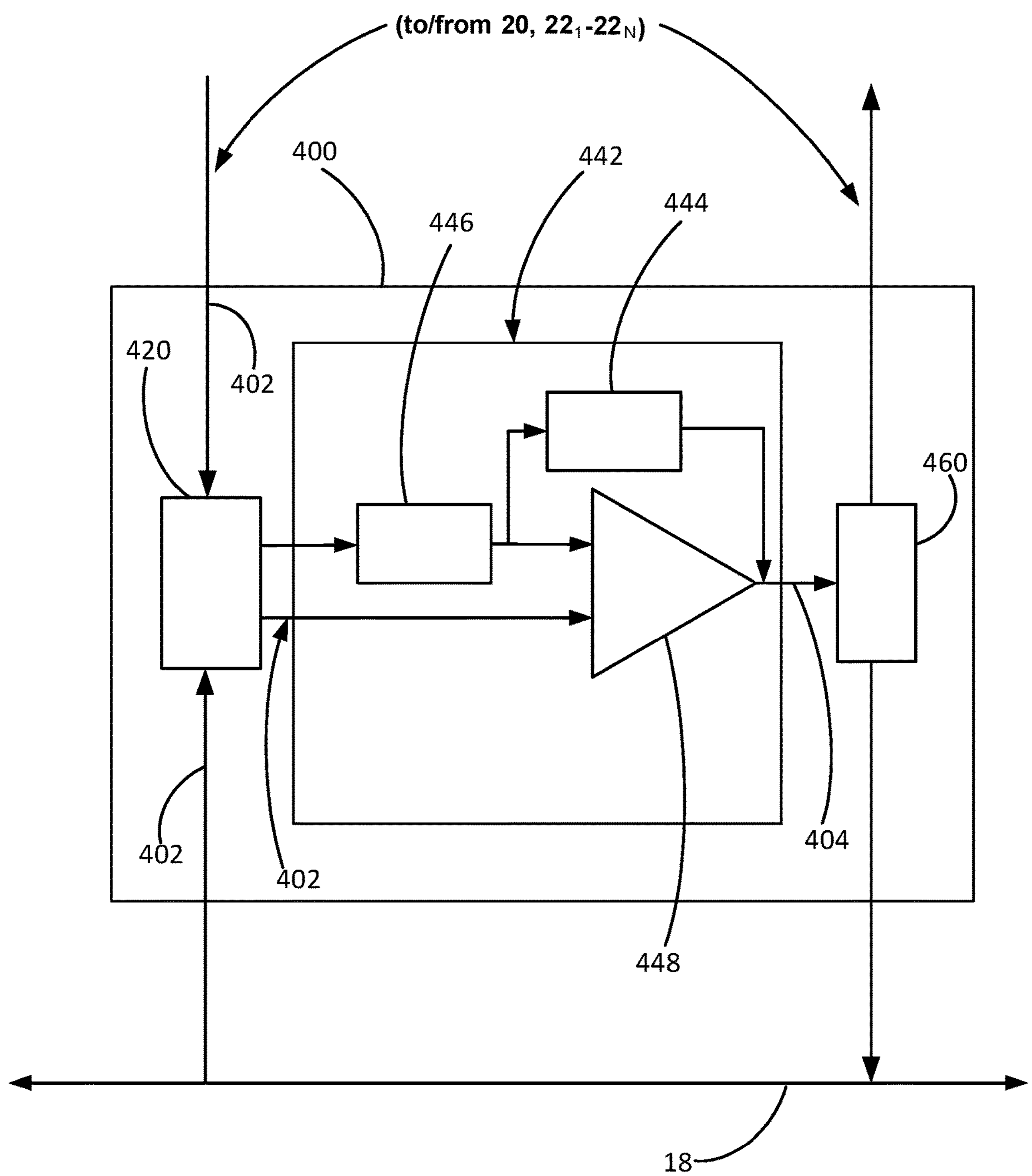
FIG. 5 is a diagrammatic and schematic view of a signal level control system in accordance with a further embodiment of the present teachings.

FIG. 5 is a diagrammatic and schematic view of a signal level control system 400 in accordance with a particular example embodiment of the present teachings. In the example embodiment, the input circuit 420 is configured to receive a first communication signal 402 from the power line 18 and/or from an associated transmitting device such as for example, from the electronic control system 20 on the tractor 12 or from any one or more of electronic control systems $22_1 \ldots 22_N$ and trailers $14_1 \ldots 14_N$. The first communication signal 402 may have a first signal level.

Also in accordance with the example embodiment, the adjustable amplifier circuit 440 is configured to apply a selectable gain to the first communication signal 402 to generate a level-adjusted communication signal 404 having a second signal level different than the first signal level of the first communication signal 402.

Still further in accordance with the example embodiment, the output circuit 460 is configured to receive the level-adjusted communication signal 404 and to broadcast the level-adjusted communication signal 404 onto the associated PLC network via the power line 18.

The adjustable amplifier circuit 440 of the embodiment shown in FIG. 5 is an adjustable attenuation circuit 442 configured to apply a selectable fractional gain to the first communication signal 402 to generate an attenuated communication signal 405 having the second signal level, wherein the second signal level of the attenuated communication signal 405 is less than the first signal level of the first communication signal 402. In the embodiment the adjustable attenuation circuit 442 applies a selectable fractional gain to the first communication signal 402, wherein the selectable fractional gain is less than unity or one (gain <1.0). The output circuit 460 is configured to receive the attenuated communication signal 405 and to broadcast the attenuated communication signal 405 onto the associated PLC network via the power line 18.

In particular and as shown, the adjustable attenuation circuit 442 includes a first resister 444 having a first resistance value, a second resister 446 having a selectable resistance value, and an amplifier circuit 448. The first resister 444 may be a logical resister stored in the logic 347 and having a first resistance value and, similarly, the second resister 446 may be a logical resister stored in the logic 347 and having a selectable resistance value. In the arrangement shown, the selectable fractional gain comprises a relationship between the first resistance value and the selectable resistance value. In particular, the selectable fractional gain comprises or is established by a ratio between the first resistance value of the first resister 444 and the selectable resistance value of the second resister 446. In the particular arrangement shown, the selectable fractional gain comprises a ratio of the first resistance value of the first resister 444 to the selectable resistance value of the second resister 446.

It is to be appreciated that although the adjustable attenuation circuit 442 of the example illustrated includes a first resister 444 having a first resistance value and a second resister 446 having a selectable resistance value, either one or the other or both of the first and/or second resisters 444, 446 may have a selectable resistance value. In that way the adjustable attenuation circuit 442 of the signal level control system 400 in accordance with an embodiment may be able to provide or otherwise apply a wider range of selectable fractional gain to the first communication signal 402 to render an attenuated communication signal 405 that is representative of a desired communication signal level.

It is further to be appreciated that in accordance with an embodiment either one or the other or both of the first and/or second resisters 444, 446 may have a fixed resistance value wherein either one or the other or both of the first and/or second resisters 444, 446 may be switched out and replaced with other resisters having different values so that the gain of the adjustable attenuation circuit 442 may be selected by a user of the signal level control system 400.

The system 400 also functions to detect irregular and/or unauthorized signals in or on the ECUs or electronic control systems 20, $\mathbf{22}_1$ . . . $\mathbf{22}_N$ on the tractor 12 and the trailers $\mathbf{14}_1$ . . . $\mathbf{14}_N$, and to control the levels of the signals communicated between the members of the tractor-trailer along the power line 18 for preventing irregular and/or unauthorized commands resulting from the detected irregular and/or unauthorized signals from being broadcast onto the PLC network by the ECUs 20, $\mathbf{22}_1$ . . . $\mathbf{22}_N$.

It is to be appreciated that the system 400 of FIG. 5 may be incorporated or otherwise provided within any of the electronic control systems $\mathbf{22}_1$ . . . $\mathbf{22}_N$ on the trailers $\mathbf{14}_1$ . . . $\mathbf{14}_N$ and/or on the electronic control system 20 on the tractor 12. That is, the system 400 may be integrated within any of the electronic control systems $\mathbf{22}_1$ . . . $\mathbf{22}_N$ on the trailers $\mathbf{14}_1$ . . . $\mathbf{14}_N$ and/or on the electronic control system 20 on the tractor 12 as a unitary package such as logic 347 stored on a computer readable medium 346, wherein the logic 347 is executable by a processor 348 of the electronic control systems 20, $\mathbf{22}_1$ . . . $\mathbf{22}_N$ to perform the functions described herein. In that way, the detection of irregular and/or unauthorized signals can be detected directly by the electronic control systems 20, $\mathbf{22}_1$ . . . $\mathbf{22}_N$ themselves which can be used to trigger attenuation of signals to be communicated between the electronic control systems 20, $\mathbf{22}_1$ . . . $\mathbf{22}_N$ and the power line 18, thereby preventing any malsignals from being delivered to the other electronic control systems 20, $\mathbf{22}_1$ . . . $\mathbf{22}_N$ that might be the result of the detected irregular and/or unauthorized signals in or on one of the electronic control systems 20, $\mathbf{22}_1$ . . . $\mathbf{22}_N$.

Figure 6:
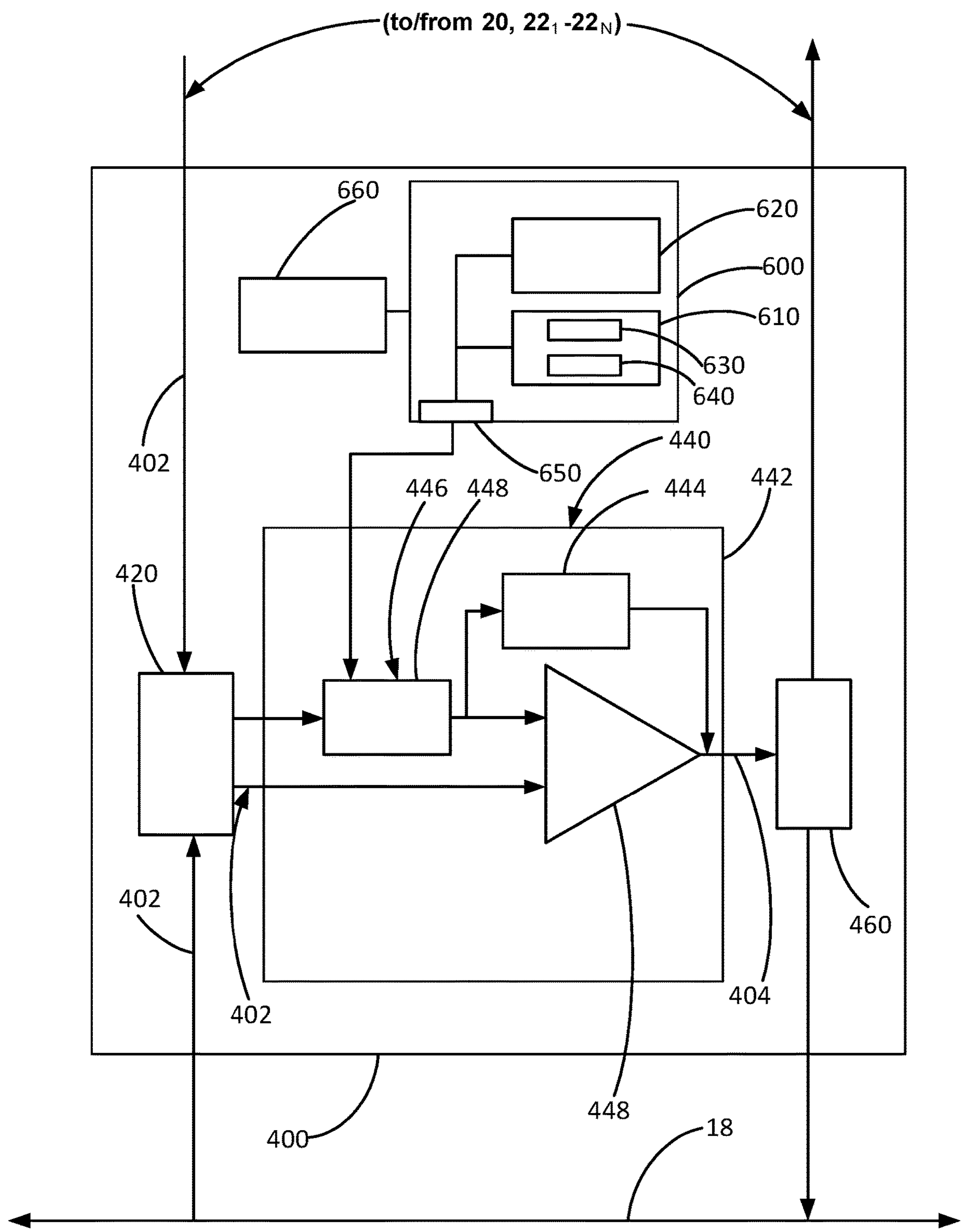
FIG. 6 is a diagrammatic and schematic view of a signal level control system in accordance with a further embodiment of the present teachings.

FIG. 6 is a diagrammatic and schematic view of a signal level control system 400 in accordance with a further particular embodiment of the present teachings. In the example embodiment, the input circuit 420 is configured to receive a first communication signal 402 from the power line 18 and/or from an associated transmitting device such as for example, from the electronic control system 20 on the tractor 12 or from any one or more of electronic control systems $\mathbf{22}_1$ . . . $\mathbf{22}_N$ and trailers $\mathbf{14}_1$ . . . $\mathbf{14}_N$. The first communication signal 402 may have a first signal level.

The adjustable amplifier circuit 440 of the embodiment shown in FIG. 6 is an adjustable attenuation circuit 442 configured to apply a selectable fractional gain to the first communication signal 402 to generate an attenuated communication signal 405 having the second signal level, wherein the second signal level of the attenuated communication signal 405 is less than the first signal level of the first communication signal 402. In the embodiment the adjustable attenuation circuit 442 applies a selectable fractional gain to the first communication signal 402, wherein the selectable fractional gain is less than unity or one (gain <1.0). The output circuit 460 is configured to receive the attenuated communication signal 405 and to broadcast the attenuated communication signal 405 onto the associated PLC network via the power line 18.

In particular and as shown, the adjustable attenuation circuit 442 includes a first resister 444 having a first resistance value, a second resister 446 having a selectable resistance value, and an amplifier circuit 448. In the arrangement shown, the selectable fractional gain comprises a relationship between the first resistance value and the selectable resistance value. In particular, the selectable fractional gain comprises a ratio between the first resistance value of the first resister 444 and the selectable resistance value of the second resister 446. In the particular arrangement shown, the selectable fractional gain comprises a ratio of the first resistance value of the first resister 444 to the selectable resistance value of the second resister 446.

It is to be appreciated that although the adjustable attenuation circuit 442 of the example illustrated includes a first resister 444 having a first resistance value and a second resister 446 having a selectable resistance value, either one or the other or both of the first and second resisters 444, 446 may have a selectable resistance value. In that way the adjustable attenuation circuit 442 of the signal level control system 400 in accordance with an embodiment may be able to provide or otherwise apply a wider range of selectable fractional gain to the first communication signal 402 to render an attenuated communication signal 405 that is representative of a desired communication signal level.

A signal level control module 600 is provided in the embodiment illustrated in FIG. 6 for selecting the selectable resistance value of the second resister 446. In this regard, the signal level control module 600 is operatively coupled with the adjustable attenuation circuit 442 and includes a memory device 610, a processor 620 operatively coupled with the memory device 610, and a control module output circuit 650 operatively coupled with the memory device 610 and the processor 620. Level set point data 630 and signal level control logic 640 are stored in the memory device 610. The level set point data 630 is representative of a desired communication signal level. The signal level control logic 640 is executable by the processor 620 to determine a command selected resistance value of the second resister 446 to set the fractional gain to control the second signal level of the attenuated communication signal 405 to have the desired communication signal level.

It is to be appreciated that the level set point data 630 representative of the desired communication signal level may be obtained from an associated user of the signal level control system 400 using a suitable user interface 660 and stored into the memory device 610 as will be described below. In this connection and in accordance with an example embodiment, the signal level control module 600 includes the user interface 660, wherein the user interface 660 is operatively coupled with and in operative communication with the signal level control module 600. Alternatively, the level set point data 630 representative of the desired communication signal level may be predetermined and stored into the memory device 610 before use of the signal level control system 400. As a further alternative, the level set point data 630 may be determined by one or more signal level detecting circuits to be described in greater detail below based on one or more of the signal levels of the 402 and/or the 404, and then stored into the memory device 610 by those one or more signal level detecting circuits. In a still further embodiment, the level set point data 630 may be determined by the processor 620 executing the control logic 640 to detect irregular and/or unauthorized signals in or on the ECUs or electronic control systems 20, $\mathbf{22}_1$ . . . $\mathbf{22}_N$ on the tractor 12 and the trailers $\mathbf{14}_1$ . . . $\mathbf{14}_N$, wherein based on the irregular and/or unauthorized signals being detected, the signal level control module 600 controls the levels of the signals communicated between the members of the tractor-trailer along the power line 18 for preventing irregular and/or unauthorized commands resulting from the detected irregular and/or unauthorized signals from being broadcast onto the PLC network by the ECUs 20, $\mathbf{22}_1$ . . . $\mathbf{22}_N$.

With continued reference to FIG. 6, the control module output circuit 650 is operable to generate a resistance select signal 652 representative of the determined command selected resistance value of the second resister 446. In an embodiment, the adjustable attenuation circuit 442 is operative in response to the resistance select signal 652 to select the resistance value of the second resister 446 to set the fractional gain to control the second signal level of the attenuated communication signal 405 to have the desired communication signal level. In an embodiment, the command selected resistance value of the second resister 446 may be determined in accordance with a signal received from an associated user by the signal level control module 600 via the user interface 660, wherein the adjustable attenuation circuit 442 is operative in response to the resistance select signal 652 to select the resistance value of the second resister 446 to set the fractional gain to control the second signal level of the attenuated communication signal 405 to have communication signal level desired by the associated user.

In accordance with a particular example embodiment, the second resister 446 may comprises a digital potentiometer 448 operatively coupled with the signal level control module 600. In the embodiment, the digital potentiometer 448 has a controllable resistance characteristic and is responsive to a resistance select signal 652 from the signal level control module 600 to adopt a resistance value in the adjustable attenuation circuit 442 to set the fractional gain to control the second signal level of the attenuated communication signal 405 to have the desired communication signal level.

It is to be appreciated that in accordance with a particular example embodiment, either one or both of the first and/or second resisters 444, 446 may comprise digital potentiometers 448 operatively coupled with the signal level control module 600. In the embodiment, the first and/or second resisters 444, 446 comprising one or more digital potentiometers have controllable resistance characteristics and are responsive to resistance select signals 652 from the signal level control module 600 to adopt a resistance value in the adjustable attenuation circuit 442 to set the fractional gain to control the second signal level of the attenuated communication signal 405 to have the desired communication signal level.

Still further in accordance with the example embodiment, the output circuit 460 is configured to receive the attenuated communication signal 405 and to broadcast the attenuated communication signal 405 onto the associated PLC network via the power line 18.

The system 400 overall therefore functions to detect irregular and/or unauthorized signals in or on the ECUs or electronic control systems 20, $\mathbf{22}_1$ . . . $\mathbf{22}_N$ on the tractor 12 and the trailers $\mathbf{14}_1$ . . . $\mathbf{14}_N$, and to control the levels of the signals communicated between the members of the tractor-trailer along the power line 18 for preventing irregular and/or unauthorized commands resulting from the detected irregular and/or unauthorized signals from being broadcast onto the PLC network by the compromised ECUs 20, $\mathbf{22}_1$ . . . $\mathbf{22}_N$.

It is to be appreciated that the system 400 of FIG. 6 may be incorporated or otherwise provided within any of the electronic control systems $\mathbf{22}_1$ . . . $\mathbf{22}_N$ on the trailers $\mathbf{14}_1$ . . . $\mathbf{14}_N$ and/or on the electronic control system 20 on the tractor 12. That is, the system 400 may be integrated within any of the electronic control systems $\mathbf{22}_1$ . . . $\mathbf{22}_N$ on the trailers $\mathbf{14}_1$ . . . $\mathbf{14}_N$ and/or on the electronic control system 20 on the tractor 12 as a unitary package such as logic 347 stored on a computer readable medium 346, wherein the logic 347 is executable by a processor 348 of the electronic control systems 20, $\mathbf{22}_1$ . . . $\mathbf{22}_N$ to perform the functions described herein. In that way, the detection of irregular and/or unauthorized signals can be detected directly by the electronic control systems 20, $\mathbf{22}_1$ . . . $\mathbf{22}_N$ themselves which can be used to trigger attenuation of signals to be communicated between the electronic control systems 20, $\mathbf{22}_1$ . . . $\mathbf{22}_N$ and the power line 18, thereby preventing any mal-signals from being delivered to the other electronic control systems 20, $\mathbf{22}_1$ . . . $\mathbf{22}_N$ that might be the result of the detected irregular and/or unauthorized signals in or on one of the electronic control systems 20, $\mathbf{22}_1$ . . . $\mathbf{22}_N$.

Figure 7:
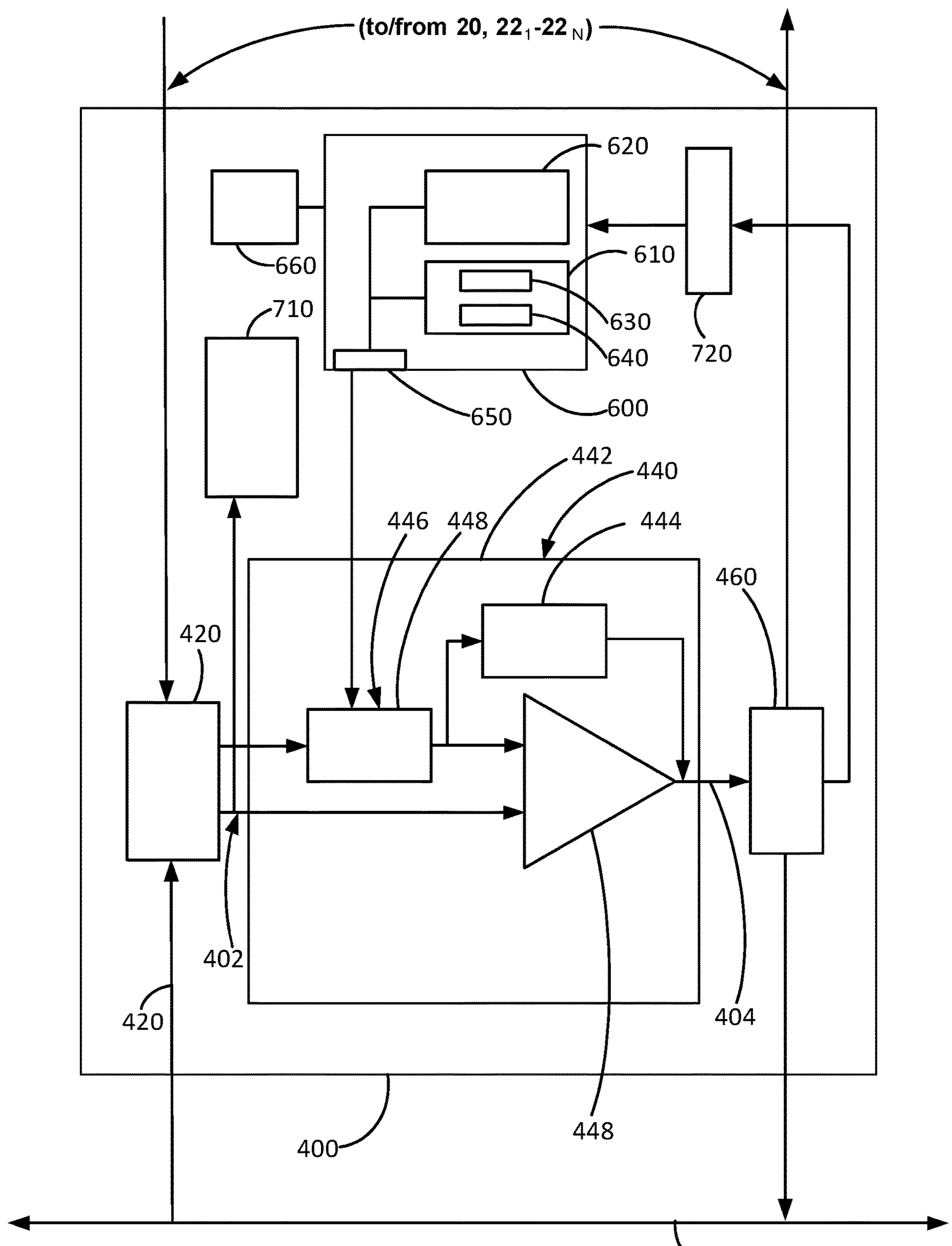
FIG. 7 is a diagrammatic and schematic view of a signal level control system in accordance with a further embodiment of the present teachings.

FIG. 7 is a diagrammatic and schematic view of a signal level control system 400 in accordance with a further particular embodiment of the present teachings. In the example embodiment, the input circuit 420 is configured to receive a first communication signal 402 from the power line 18 and/or from an associated transmitting device such as for example, from the electronic control system 20 on the tractor 12 or from any one or more of electronic control systems $\mathbf{22}_1$ . . . $\mathbf{22}_N$ and trailers $\mathbf{14}_1$ . . . $\mathbf{14}_N$. The first communication signal 402 may have a first signal level.

The adjustable amplifier circuit 440 of the embodiment shown in FIG. 7 is an adjustable attenuation circuit 442 configured to apply a selectable fractional gain to the first communication signal 402 to generate an attenuated communication signal 405 having the second signal level, wherein the second signal level of the attenuated communication signal 405 is less than the first signal level of the first communication signal 402. In the embodiment the adjustable attenuation circuit 442 applies a selectable fractional gain to the first communication signal 402, wherein the selectable fractional gain is less than unity or one (gain $<1.0$). The output circuit 460 is configured to receive the attenuated communication signal 405 and to broadcast the attenuated communication signal 405 onto the associated PLC network via the power line 18.

In particular and as shown, the adjustable attenuation circuit 442 includes a first resister 444 having a first resistance value, a second resister 446 having a selectable resistance value, and an amplifier circuit 448. In the arrangement shown, the selectable fractional gain comprises a relationship between the first resistance value and the selectable resistance value. In particular, the selectable fractional gain comprises a ratio between the first resistance value of the first resister 444 and the selectable resistance value of the second resister 446. In the particular arrangement shown, the selectable fractional gain comprises a ratio of the first resistance value of the first resister 444 to the selectable resistance value of the second resister 446.

It is to be appreciated that although the adjustable attenuation circuit 442 of the example illustrated includes a first resister 444 having a first resistance value and a second resister 446 having a selectable resistance value, either one or the other or both of the first and second resisters 444, 446 may have a selectable resistance value. In that way the adjustable attenuation circuit 442 of the signal level control system 400 in accordance with an embodiment may be able to provide or otherwise apply a wider range of selectable fractional gain to the first communication signal 402 to render an attenuated communication signal 405 that is representative of a desired communication signal level.

An input signal level detecting circuit 710 is provided in the embodiment illustrated in FIG. 7 for determining a level of the input signal and selecting the selectable resistance value of the second resister 446 in accordance with the determined level of the input signal. In this regard, the input signal level detecting circuit 710 is operatively coupled with the signal level control module 600. The input signal level detecting circuit 710 is operative to detect the first signal level of the first communication signal 402. In the example embodiment, the signal level control logic 640 is executable by the processor 620 to determine the selectable resistance value of the second resister 446 based on the first signal level of the first communication signal 402 detected by the input signal level detecting circuit 710 to set the fractional gain to control the second signal level of the attenuated communication signal 405 to have the desired communication signal level.

In addition, an output signal level detecting circuit 720 is provided in the embodiment illustrated in FIG. 7 for determining a level of the output signal and selecting the selectable resistance value of the second resister 446 in accordance with the determined level of the input signal. In this regard, the output signal level detecting circuit 720 is operatively coupled with the signal level control module 600. The output signal level detecting circuit 720 is operative to detect the second signal level of the attenuated communication signal 405. In the example embodiment, the signal level control logic 640 is executable by the processor 620 to determine the selectable resistance value of the second resister 446 based on the second signal level of the attenuated communication signal 405 detected by the output signal level detecting circuit 720 to set the fractional gain to control the second signal level of the attenuated communication signal 405 to have the desired communication signal level.

The system 400 also functions to detect irregular and/or unauthorized signals in or on the ECUs or electronic control systems 20, $\mathbf{22}_1 \ldots \mathbf{22}_N$ on the tractor 12 and the trailers $\mathbf{14}_1 \ldots \mathbf{14}_N$, and to control the levels of the signals communicated between the members of the tractor-trailer along the power line 18 for preventing irregular and/or unauthorized commands resulting from the detected irregular and/or unauthorized signals from being broadcast onto the PLC network by the compromised ECUs 20, $\mathbf{22}_1 \ldots \mathbf{22}_N$.

It is to be appreciated that the system 400 of FIG. 7 may be incorporated or otherwise provided within any of the electronic control systems $\mathbf{22}_1 \ldots \mathbf{22}_N$ on the trailers $\mathbf{14}_1 \ldots \mathbf{14}_N$ and/or on the electronic control system 20 on the tractor 12. That is, the system 400 may be integrated within any of the electronic control systems $\mathbf{22}_1 \ldots \mathbf{22}_N$ on the trailers $\mathbf{14}_1 \ldots \mathbf{14}_N$ and/or on the electronic control system 20 on the tractor 12 as a unitary package such as logic 347 stored on a computer readable medium 346, wherein the logic 347 is executable by a processor 348 of the electronic control systems 20, $\mathbf{22}_1 \ldots \mathbf{22}_N$ to perform the functions described herein.

Figure 8:
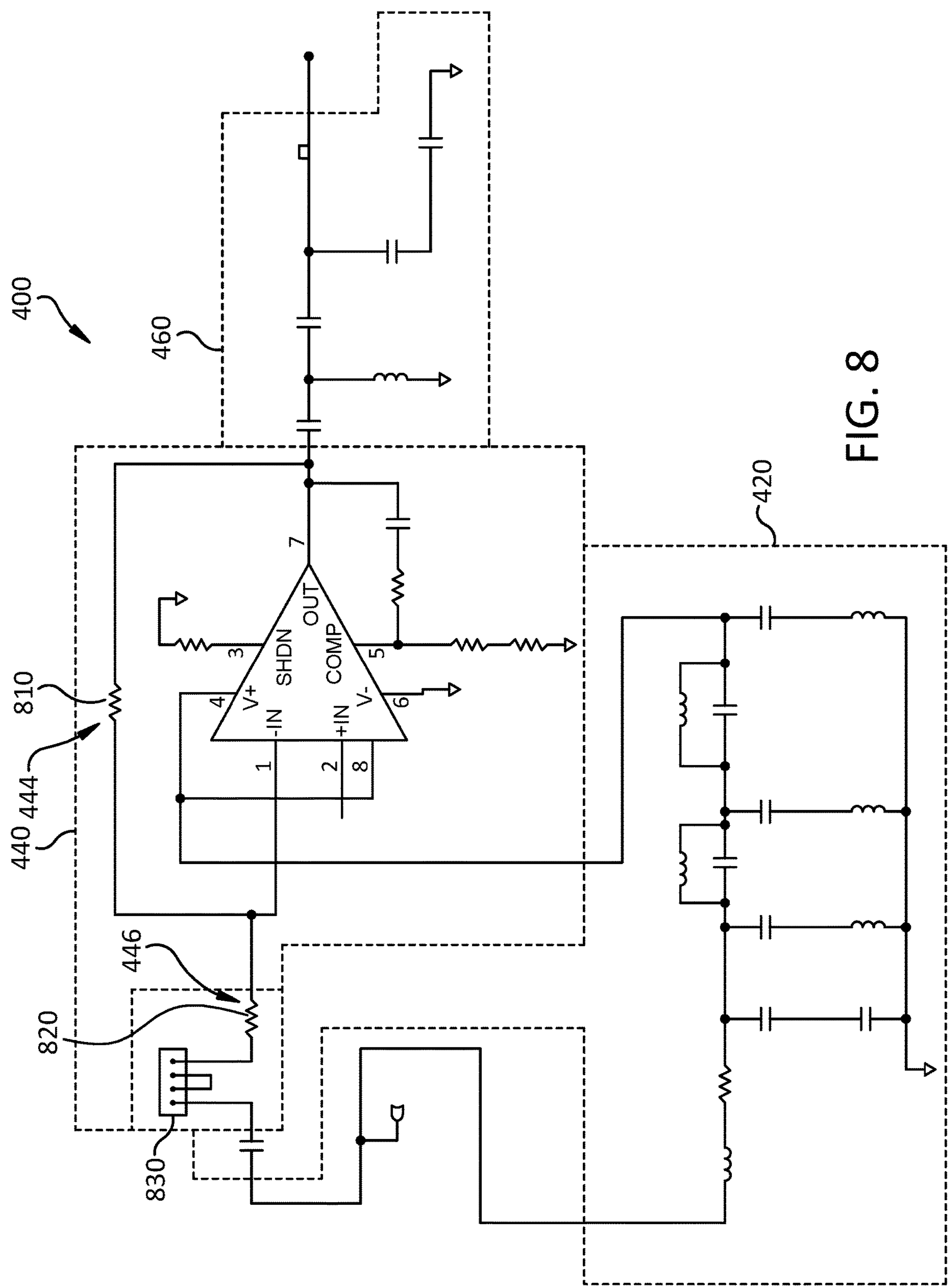
FIG. 8 is a diagrammatic and schematic view of a signal level control system in accordance with a further embodiment of the present teachings.

FIG. 8 is a diagrammatic and schematic view of a signal level test and control system 400 in accordance with a further embodiment of the present teachings for testing and/or controlling a level of communication signals broadcast onto an associated power line communication (PLC) network 18 by an associated transmitting device 20, $\mathbf{22}_1 \ldots \mathbf{22}_N$. The system 400 includes an input circuit 420, an adjustable amplifier circuit 440 operatively coupled with the input circuit 420, and an output circuit 460 operatively coupled with the adjustable amplifier circuit 440. The input circuit 420 is configured to receive a first communication signal 402 from the power line 18 and/or from an the associated transmitting devices, wherein the first communication signal 402 has a first signal level. The adjustable amplifier circuit 440 is configured to apply a selectable gain to the first communication signal 402 to generate a level-adjusted communication signal 404 having a second signal level different than the first signal level of the first communication signal 402. The output circuit 460 is configured to receive the level-adjusted communication signal 404 and to broadcast the level-adjusted communication signal 404 onto the associated PLC network 18.

In the example embodiment, the adjustable amplifier circuit 440 of the system 400 includes an adjustable attenuation circuit 442 configured to apply a selectable fractional gain to the first communication signal 402 to generate an attenuated communication signal 405 having the second signal level, wherein the second signal level of the attenuated communication signal 405 is less than the first signal level of the first communication signal 402. The output circuit 460 is configured to receive the attenuated communication signal 405 and to broadcast the attenuated communication signal 405 onto the associated PLC network 18.

In the example embodiment, the adjustable attenuation circuit 442 of the system 400 includes a first resister 444 having a first resistance value, and a second resister 446 having a selectable resistance value. In the example, the selectable fractional gain is a relationship between the first resistance value of the first resister 444 and the selectable resistance value of the second resister 446. Also in the embodiment, the first resister 444 includes a fixed resister device 810, and the second resister 446 includes a fixed resister device 820. The second resister 446 further includes a jumper connecter 830 for selective insertion of further resisters into the circuit, wherein the inserted resisters are arranged in series with the second resister 446.

The resistance at the jumper connecter 830 may be varied by the user to set the gain of the system 400 so that an output signal having the desired level is realized and, in particular, the resistance at the jumper connecter 830 may be varied by the user to set the attenuation (a gain of less than unity or one; gain <1.0) of the system 400 so that an output signal having the desired level is realized.

It is further to be appreciated that in accordance with an embodiment either one or the other or both of the first and/or second resisters 444, 446 may have a fixed resistance value wherein either one or the other or both of the first and/or second resisters 444, 446 may be switched out and replaced with other resisters having different values so that the gain of the adjustable attenuation circuit 442 may be selected by a user of the signal level control system 400.

Figure 9:
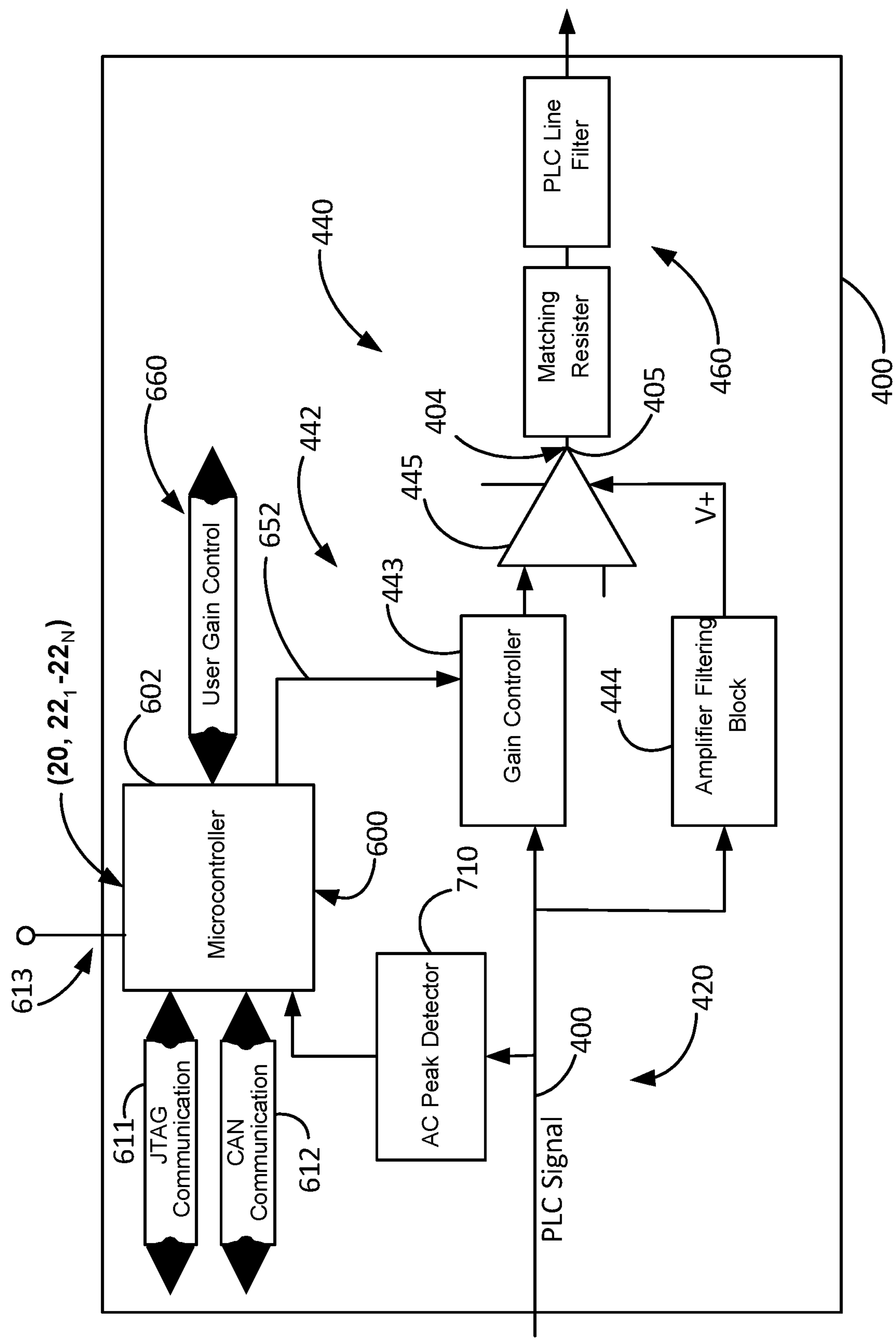
FIG. 9 is a diagrammatic and schematic view of a signal level control system in accordance with a further embodiment of the present teachings.

FIG. 9 is a diagrammatic and schematic view of a signal level control system 400 in accordance with a further embodiment of the present teachings. Referring now to that Figure, each of the signal level control systems 24, $\mathbf{26}_1$ . . . $\mathbf{26}_N$ on tractor 12 and trailers $\mathbf{14}_1$ . . . $\mathbf{14}_N$ may include a system 400 such as shown in the Figure in block functional form for controlling a level of communication signals broadcast onto an associated power line communication (PLC) network by an associated transmitting device such as for example, by the one or more of electronic control systems 20, $\mathbf{22}_1$ . . . $\mathbf{22}_N$ on the tractor 12 and trailers $\mathbf{14}_1$ . . . $\mathbf{14}_N$. The system 400 also functions to detect irregular and/or unauthorized signals in or on the ECUs or electronic control systems 20, $\mathbf{22}_1$ . . . $\mathbf{22}_N$ on the tractor 12 and the trailers $\mathbf{14}_1$ . . . $\mathbf{14}_N$, and to control the levels of the signals communicated between the members of the tractor-trailer along the power line 18 for preventing irregular and/or unauthorized commands resulting from the detected irregular and/or unauthorized signals from being broadcast onto the PLC network by the compromised ECUs 20, $\mathbf{22}_1$ . . . $\mathbf{22}_N$. In the example embodiment, the system 400 includes an input circuit 420, an adjustable amplifier circuit 440 operatively coupled with the input circuit 420, and an output circuit 460 operatively coupled with the adjustable amplifier circuit 440. In the example embodiment, the input circuit 420 is configured to receive a first communication signal 402 from the power line 18 and/or from an associated transmitting device such as for example, from the electronic control system 20 on the tractor 12 or from any one or more of electronic control systems $\mathbf{22}_1$ . . . $\mathbf{22}_N$ on the trailers $\mathbf{14}_1$ . . . $\mathbf{14}_N$. The first communication signal 402 may have a first signal level. In the example embodiment, the input circuit 420 includes an AC peak detector circuit 422 for detecting the peak amplitude of the PLC signal received into the circuit 400.

Also in accordance with the example embodiment, the adjustable amplifier circuit 440 is configured to apply a selectable gain to the first communication signal 402 to generate a level-adjusted communication signal 404 having a second signal level different than the first signal level of the first communication signal 402. In accordance with an example embodiment, the selectable gain may amplify the first communication signal 402; that is, apply a gain greater than unity or one (gain >1.0). In accordance with an example embodiment, the selectable gain may attenuate the first communication signal 402; that is, apply a gain of less than one (gain <1.0).

Still further in accordance with the example embodiment, the output circuit 460 is configured to receive the level-adjusted communication signal 404 and to broadcast the level-adjusted communication signal 404 onto the associated PLC network via the power line 18.

In a particular example embodiment, the adjustable amplifier circuit 440 may comprise an adjustable attenuation circuit 442 configured to apply a selectable fractional gain to the first communication signal 402 to generate an attenuated communication signal 405 having the second signal level, wherein the second signal level of the attenuated communication signal 405 is less than the first signal level of the first communication signal 402. In the embodiment the adjustable attenuation circuit 442 applies a selectable fractional gain to the first communication signal 402, wherein the selectable fractional gain is less than one (gain <1.0). in this regard, the adjustable attenuation circuit 442 includes a gain controller 443, an amplifier filtering block 444, and an OP amp 445. The gain controller 443 is responsive to a signal from a signal level control module 600 such as a microcontroller 602 for example.

The signal level control module 600 is operatively coupled with the adjustable attenuation circuit 442 and includes a memory device, a processor operatively coupled with the memory device, and a control module output circuit operatively coupled with the memory device and the processor. Level set point data and signal level control logic are stored in the memory device of the signal level control module 600. The level set point data is representative of a desired communication signal level. The signal level control logic is executable by the processor to determine a command selected resistance value resister values of the gain controller 443 to set the fractional gain to control the second signal level of the attenuated communication signal 405 to have the desired communication signal level.

It is to be appreciated that the level set point data representative of the desired communication signal level may be obtained from an associated user of the signal level control system 400 using a suitable user interface 660 and stored into the memory device 610 as will be described below. In this connection and in accordance with an example embodiment, the signal level control module 600 includes the user interface 660, wherein the user interface 660 is operatively coupled with and in operative communication with the signal level control module 600. Alternatively, the level set point data representative of the desired communication signal level may be predetermined and stored into the memory device before use of the signal level control system 400. As a further alternative, the level set point data may be determined by one or more signal level detecting circuits to be described in greater detail below based on one or more of the signal levels of the 402 and/or the 404, and then stored into the memory device by those one or more signal level detecting circuits. In a still further embodiment, the level set point data may be determined by the processor of the signal level control module 600 executing the control logic to detect irregular and/or unauthorized signals in or on the ECUs or electronic control systems 20, $\mathbf{22}_1$ . . . $\mathbf{22}_N$ on the tractor 12 and the trailers $\mathbf{14}_1$ . . . $\mathbf{14}_N$, wherein based on the irregular and/or unauthorized signals being detected, the signal level control module 600 controls the levels of the signals communicated between the members of the tractor-trailer along the power line 18 for preventing irregular and/or unauthorized commands resulting from the detected irregular and/or unauthorized signals from being broadcast onto the PLC network by the ECUs 20, $\mathbf{22}_1$ . . . $\mathbf{22}_N$. In this regard the signal level control module 600 of the control system 400 incudes a Joint Test Action Group (JTAG) port 611 for connection of associated other testing and programming devices on a JTAG network for inspection, programming and testing of the signal level control system 400. The signal level control module 600 of the control system 400 further incudes a CAN port 612 for communicating with one or more associated devices via a CAN of the associated tractor trailer vehicle 10. In accordance with example embodiments herein, the signal level control module 600 is configured to determine nefarious hackers that are able to take control or otherwise corrupt the internal vehicle network such as for example the CAN, and the module 600 is further configured to determined unauthorized access to the JTAG port. These may damage the vehicle or may lead to bad results such as vehicle accidents or the like.

In accordance with the example embodiment, the module 400 operates to detect irregular and/or unauthorized signals in one or more internal vehicle networks such as for example the automotive Ethernet, the CAN, and/or the JTAG, for preventing irregular and/or unauthorized commands resulting from the detected irregular and/or unauthorized signals from being broadcast onto the PLC network by attenuating the levels of signals communicated between members of a tractor-trailer along a power line extending between the members of the tractor-trailer.

With continued reference to FIG. 9, the control module output circuit 650 is operable to generate a resistance select signal 652 representative of the determined command selected resistance value of the gain controller 443. In an embodiment, the adjustable attenuation circuit 442 is operative in response to the resistance select signal 652 to select the resistance value of the second resister 446 to set the fractional gain to control the second signal level of the attenuated communication signal 405 to have the desired communication signal level. In an embodiment, the command selected resistance value of the second resister 446 may be determined in accordance with a signal received from an associated user by the signal level control module 600 via the user interface 660, wherein the adjustable attenuation circuit 442 is operative in response to the resistance select signal 652 to select the resistance value of the second resister 446 to set the fractional gain to control the second signal level of the attenuated communication signal 405 to have communication signal level desired by the associated user.

Still further in accordance with the example embodiment, the output circuit 460 is configured to receive the attenuated communication signal 405 and to broadcast the attenuated communication signal 405 onto the associated PLC network via the power line 18.

The output circuit 460 is configured to receive the attenuated communication signal 405 and to broadcast the attenuated communication signal 405 onto the associated PLC network via the power line 18.

It is to be appreciated that the functional blocks shown in FIG. 9 may be replicated in the signal level control system 24 of an example embodiment disposed between the electronic control system 20 on the tractor 12 and the PLC communications network for attenuating signals to be delivered from the power line 18 to the signal level control system 24 of the example embodiment for signals flowing from the power line 18 to the signal level control system 24 on the tractor 12 via the signal level control system 24. In that way, the detection of irregular and/or unauthorized signals in or on the ECUs $\mathbf{22}_1 \ldots \mathbf{22}_N$ on trailers $\mathbf{14}_1 \ldots \mathbf{14}_N$ can be used to trigger attenuation of signals to be delivered to the electronic control system 20 on the tractor 12 thereby preventing any mal-signals from being delivered to the electronic control system 20 on the tractor 12 that might be the result of the detected irregular and/or unauthorized signals in or on the ECUs $\mathbf{22}_1 \ldots \mathbf{22}_N$ on trailers $\mathbf{14}_1 \ldots \mathbf{14}_N$.

Similarly, it is to be appreciated that the functional blocks shown in FIG. 9 are replicated in the one or more signal level control systems $\mathbf{26}_1 \ldots \mathbf{26}_N$ on the trailers $\mathbf{14}_1 \ldots \mathbf{14}_N$ of an example embodiment disposed between the electronic control systems $\mathbf{22}_1 \ldots \mathbf{22}_N$ on the trailers $\mathbf{14}_1 \ldots \mathbf{14}_N$ and the PLC communications network for attenuating signals to be delivered from the power line 18 to the one or more of electronic control systems $\mathbf{22}_1 \ldots \mathbf{22}_N$ on the trailers $\mathbf{14}_1 \ldots \mathbf{14}_N$ via the electronic control systems $\mathbf{22}_1 \ldots \mathbf{22}_N$ on the trailers $\mathbf{14}_1 \ldots \mathbf{14}_N$. In that way, the detection of irregular and/or unauthorized signals in or on the electronic control system 20 on the tractor 12 can be used to trigger attenuation of signals to be delivered to the electronic control system $\mathbf{22}_1 \ldots \mathbf{22}_N$ on the trailers $\mathbf{14}_1 \ldots \mathbf{14}_N$ thereby preventing any mal-signals from being delivered to the electronic control system $\mathbf{22}_1 \ldots \mathbf{22}_N$ on the trailers $\mathbf{14}_1 \ldots \mathbf{14}_N$ that might be the result of the detected irregular and/or unauthorized signals in or on the electronic control system 20 on the tractor 12.

It is to be appreciated that the system 400 of FIG. 9 may be incorporated or otherwise provided within any of the electronic control systems $\mathbf{22}_1 \ldots \mathbf{22}_N$ on the trailers $\mathbf{14}_1 \ldots \mathbf{14}_N$ and/or on the electronic control system 20 on the tractor 12. That is, the system 400 may be integrated within any of the electronic control systems $\mathbf{22}_1 \ldots \mathbf{22}_N$ on the trailers $\mathbf{14}_1 \ldots \mathbf{14}_N$ and/or on the electronic control system 20 on the tractor 12 as a unitary package such as logic 347 stored on a computer readable medium 346, wherein the logic 347 is executable by a processor 348 of the electronic control systems 20, $\mathbf{22}_1 \ldots \mathbf{22}_N$ to perform the functions described herein. In that way, the detection of irregular and/or unauthorized signals can be detected directly by the electronic control systems 20, $\mathbf{22}_1 \ldots \mathbf{22}_N$ themselves which can be used to trigger attenuation of signals to be communicated between the electronic control systems 20, $\mathbf{22}_1 \ldots \mathbf{22}_N$ and the power line 18, thereby preventing any mal-signals from being delivered to the other electronic control systems 20, $\mathbf{22}_1 \ldots \mathbf{22}_N$ that might be the result of the detected irregular and/or unauthorized signals in or on one of the electronic control systems 20, $\mathbf{22}_1 \ldots \mathbf{22}_N$.

Figure 10:
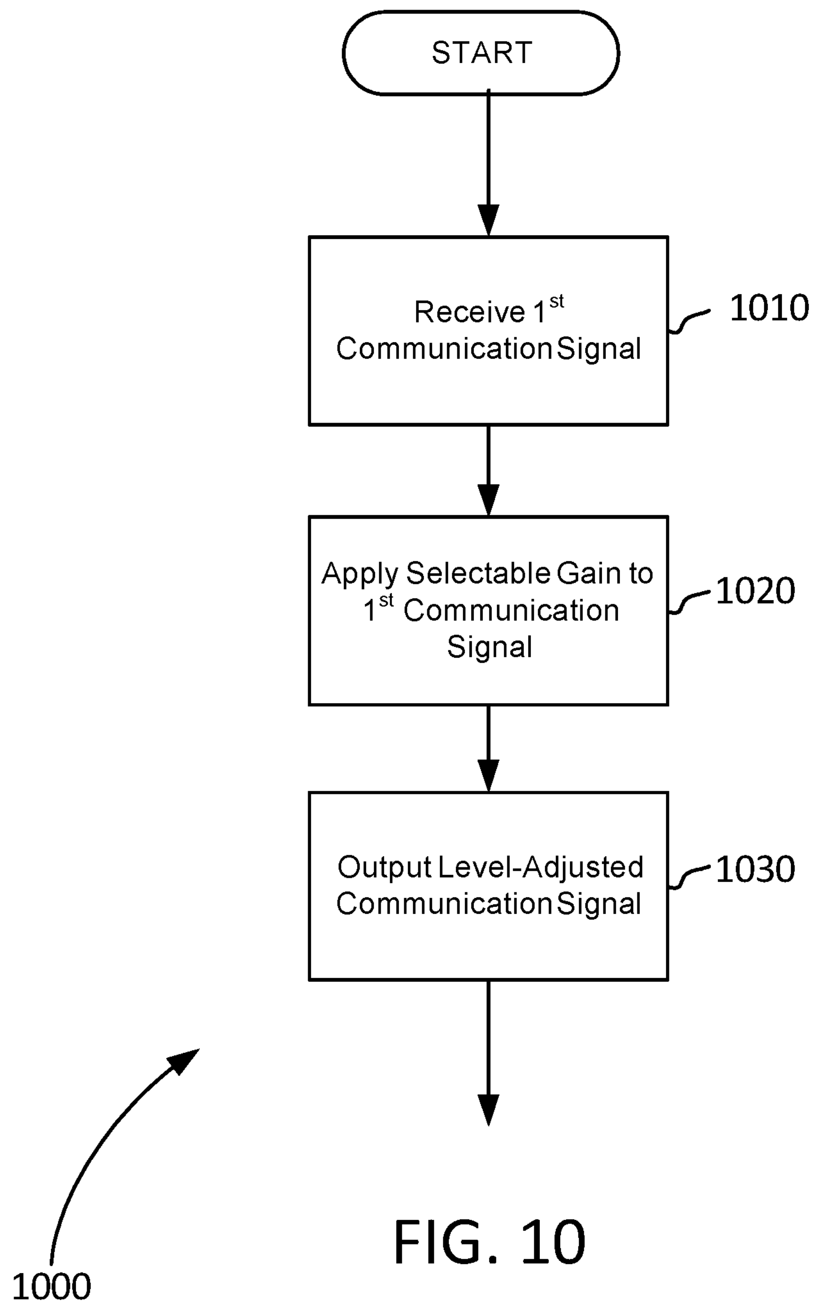
FIG. 10 is a flow diagram showing a method for controlling a level of a signal in accordance with an embodiment of the present teachings.

FIG. 10 is a flow diagram showing a method 1000 for controlling a level of a signal in accordance with an embodiment of the present teachings. In accordance with an embodiment, a method 1000 is provided for controlling a level of communication signals broadcast onto an associated power line communication (PLC) network 18 by an associated transmitting device 20, $\mathbf{22}_1 \ldots \mathbf{22}_N$ is provided.

A first communication signal 402 is received from the associated transmitting device at step 1010. The first communication signal 402 is received by an input circuit 420 of a system 400. The first communication signal 402 has a first signal level.

A selectable gain is applied to the first communication signal 402 at step 1020 to generate a level-adjusted communication signal 404 having a second signal level different than the first signal level of the first communication signal 402. In the example embodiment, the selectable gain is applied an adjustable amplifier circuit 440 of the system 400, wherein the adjustable amplifier circuit 440 is operatively coupled with the input circuit 420.

The level-adjusted communication signal 404 is broadcast onto the associated PLC network 18 in step 1030.

Figure 11:
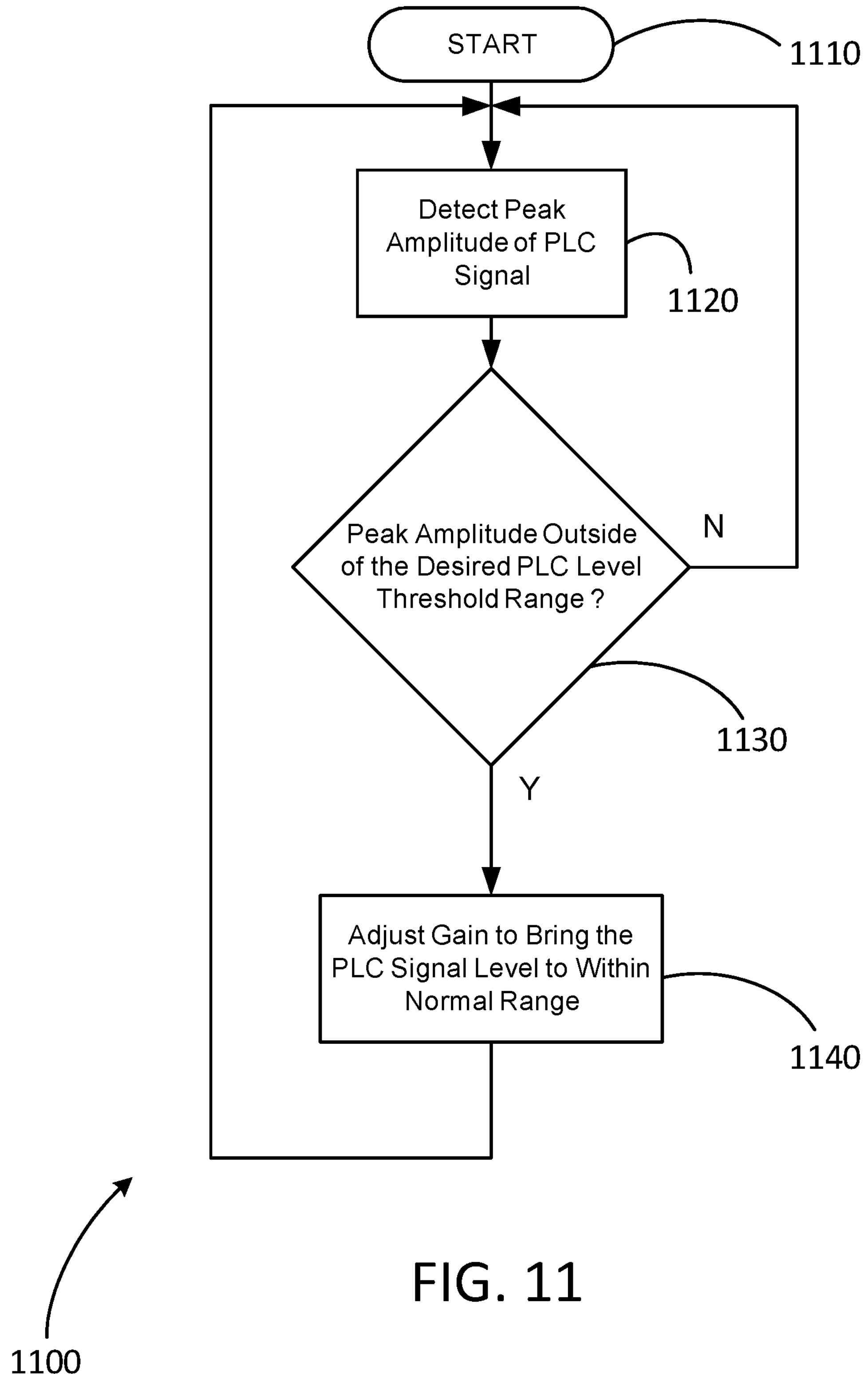
FIG. 11 is a flow diagram showing a method for controlling a level of a signal based on a detected peak signal level in accordance with an embodiment of the present teachings.

FIG. 11 is a flow diagram showing a method 1100 for controlling a level of a signal based on a detected peak signal level in accordance with an embodiment of the present teachings. The method 1100 starts at 1110 and the peak amplitude of the PLC signal is detected at step 1120.

If the detected peak amplitude is outside of a desired PLC level threshold range as determined at step 1130, the gain of the signal is adjusted at step 1140. If the detected peak amplitude is above the desired PLC level threshold range as determined at step 1130, PLC signal is attenuated. Conversely, if the detected peak amplitude is below the desired PLC level threshold range as determined at step 1130, PLC signal is amplified.

After completing the step 1140, the method returns to step 1120 where the peak amplitude of the PLC signal is detected again. By following this loop the gain of the PLC signal is adjusted until the detected peak amplitude is made to fall within the desired PLC level threshold range as determined at step 1130.

Figure 12:
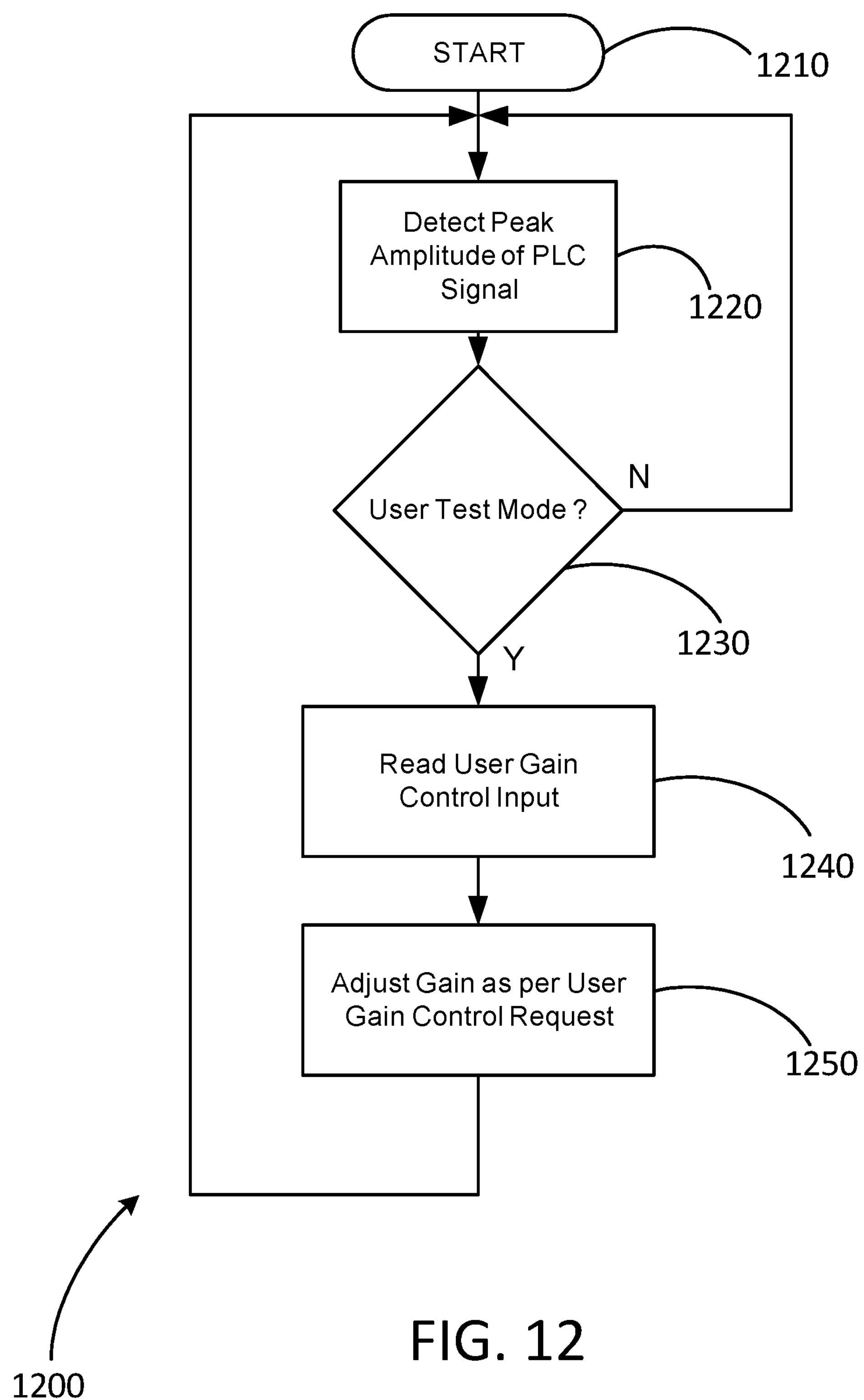
FIG. 12 is a flow diagram showing a method for controlling a level of a signal based on a gain control selected by an associated user in accordance with an embodiment of the present teachings.

FIG. 12 is a flow diagram showing a method 1200 for controlling a level of a signal based on a gain control selected by an associated user in accordance with an embodiment of the present teachings.

The method 1200 starts at 1210 and the peak amplitude of the PLC signal is detected at step 1220.

If the signal level control system 400 is in a User Test Mode as determined at step 1230, the system operates to receive or otherwise read a gain set by a user of the system at step 1240. In this connection the user-adjusted gain may be read from the user gain control network interface 660 such as shown for example in FIG. 9.

If the user-adjusted gain is set to <1, the PLC signal is attenuated at step 1250. Conversely, if the user-adjusted gain is set to >1, the PLC signal is amplified at step 1250.

After completing the step 1250, the method returns to step 1220 where the peak amplitude of the PLC signal is detected again. By following this loop the gain of the PLC signal is adjusted using a gain as set by a user of the signal level control system.

Figure 13:
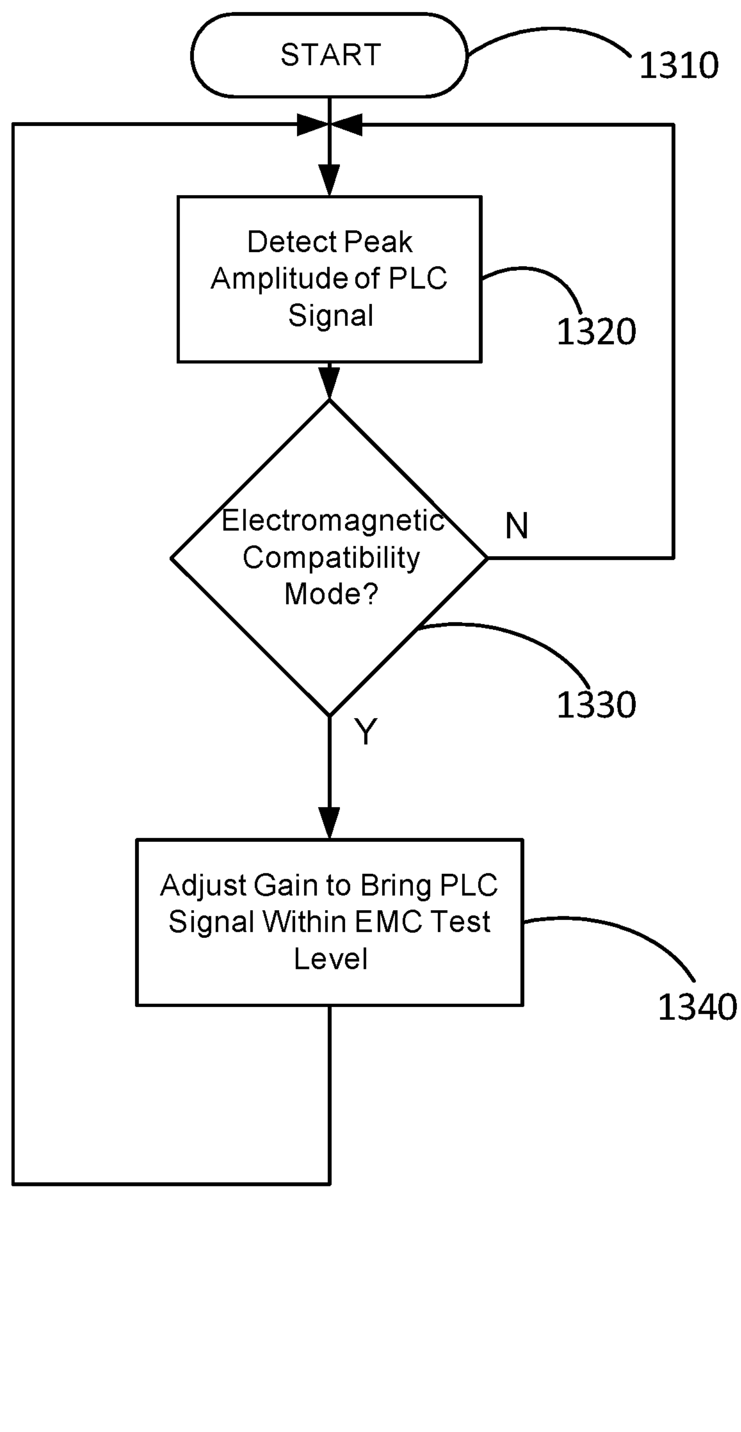
FIG. 13 is a flow diagram showing a method for controlling a level of a signal based on a detected peak signal level while operating in an electromagnetic compatibility mode in accordance with an embodiment of the present teachings.

FIG. 13 is a flow diagram showing a method 1300 for controlling a level of a signal based on a detected peak signal level while operating in an electromagnetic compatibility mode (ECM) in accordance with an embodiment of the present teachings. The method 1300 starts at 1310 and the peak amplitude of the PLC signal is detected at step 1320.

If the signal level control system 400 is in the ECM as determined at step 1330, the system operates to adjust the gain at step 1340.

If the detected peak amplitude is outside of a desired EMC Test Level threshold range as determined at step 1340, the gain of the signal is adjusted at step 1340. If the detected peak amplitude is above the desired EMC Test Level threshold range as determined at step 1340, PLC signal is attenuated. Conversely, if the detected peak amplitude is below the desired EMC Test Level threshold range as determined at step 1340, PLC signal is amplified.

After completing the step 1340, the method returns to step 1320 where the peak amplitude of the PLC signal is detected again. By following this loop the gain of the PLC signal is adjusted until the detected peak amplitude is made to fall within the desired EMC Test Level threshold range as determined at step 1340.

Figure 14:
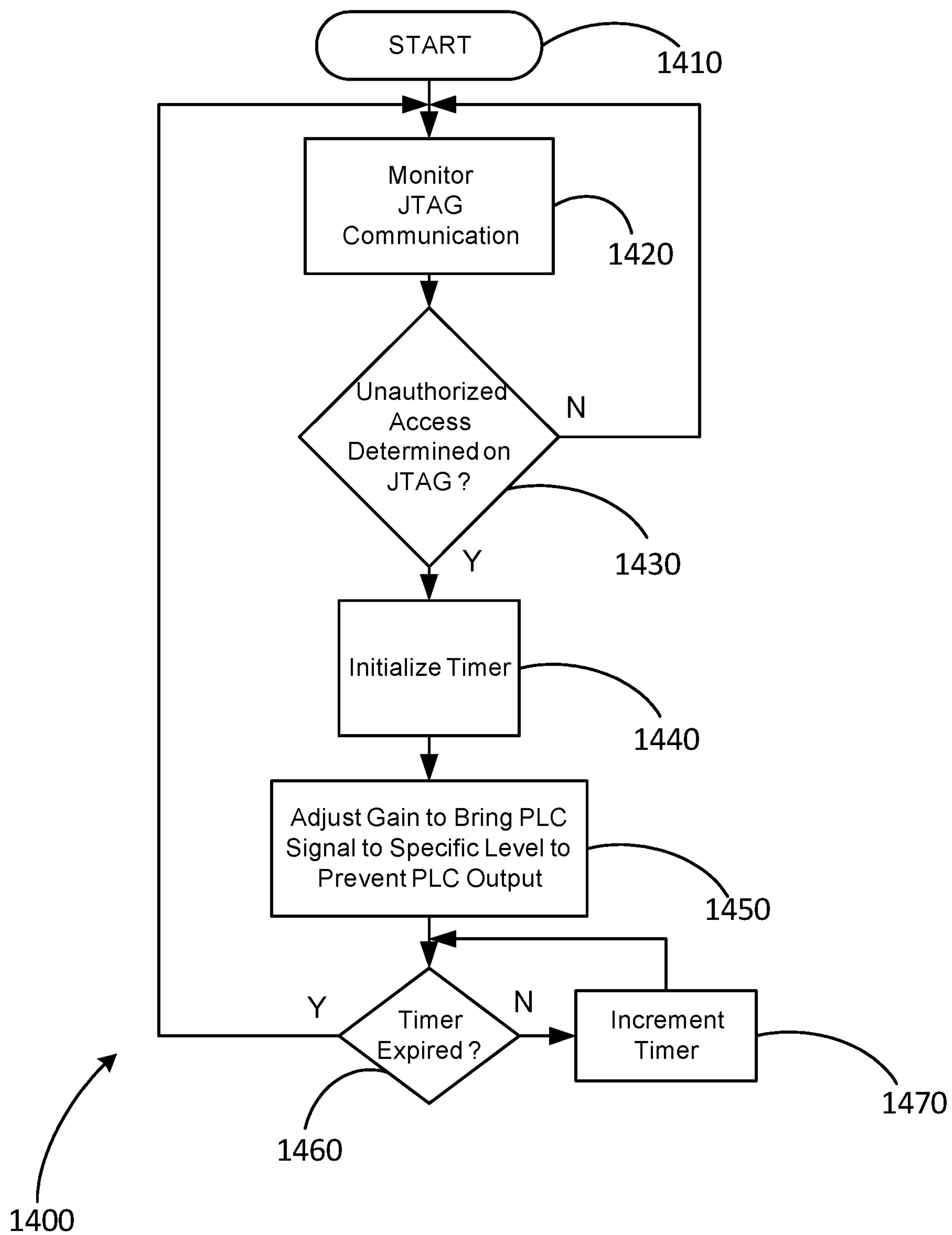
FIG. 14 is a flow diagram showing a method for controlling a level of a signal based on a detected unauthorized access to a JTAG port of the signal level control system in accordance with an embodiment of the present teachings.

FIG. 14 is a flow diagram showing a method 1400 for controlling a level of a signal based on a detected unauthorized access to a JTAG port of the signal level control system in accordance with an embodiment of the present teachings.

The communications on the JTAG network interface 611 (FIG. 6) is monitored in step 1420. If any unauthorized communication is detected on the JTAG network interface as determined at step 1430, a timer is set or otherwise initiated at step 1440, and the gain of the signal level control system is adjusted to bring the PLC signal to a specific low level to prevent PLC output from the and onto the PLC network 18.

The signal is held in the attenuated condition until the timer expires such as determined at step 1460. The timer is incremented at step 1470 until the timer expiration is determined at step 1460.

Figure 15:
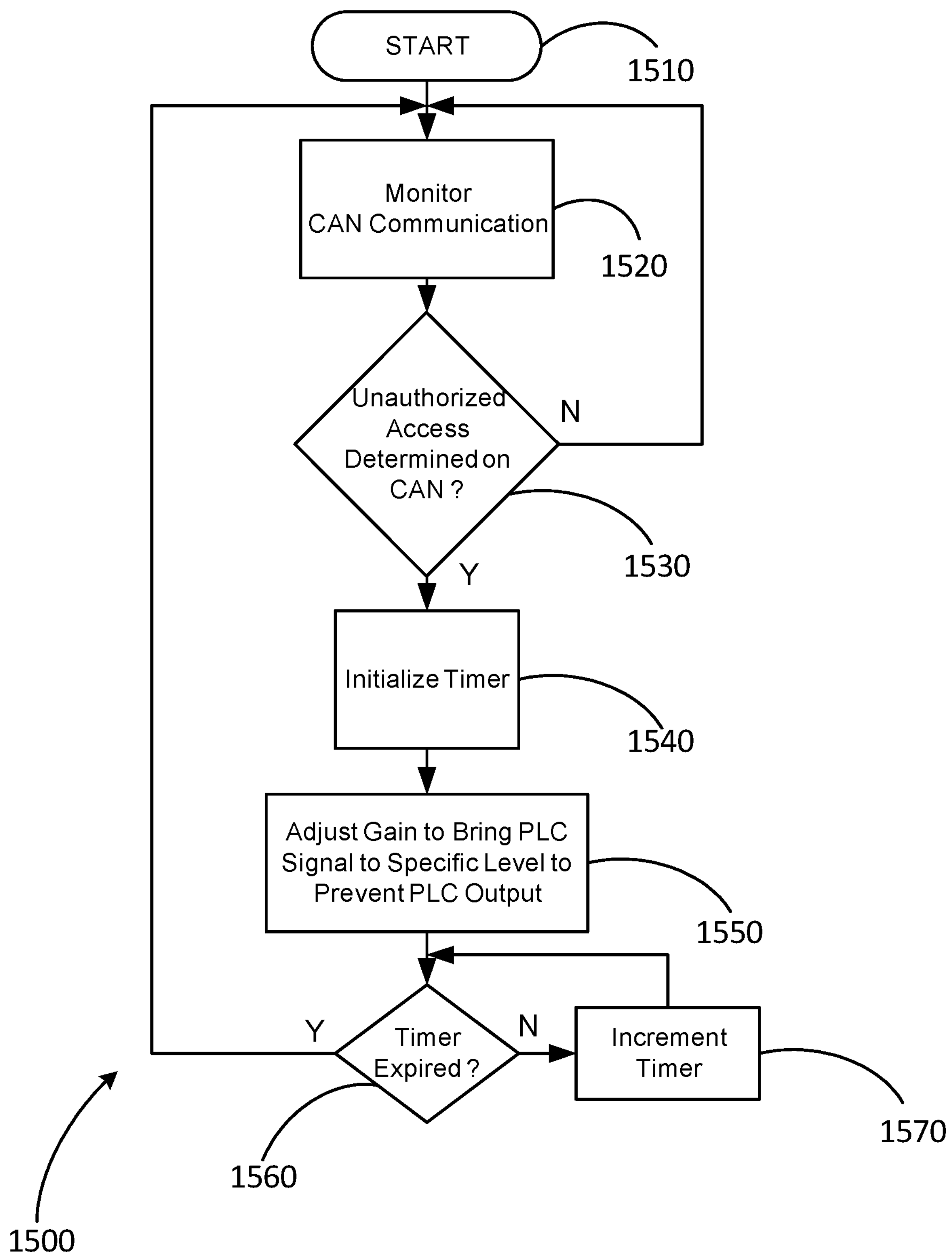
FIG. 15 is a flow diagram showing a method for controlling a level of a signal based on a detected unauthorized access to a vehicle CAN port of the signal level control system in accordance with an embodiment of the present teachings.

FIG. 15 is a flow diagram showing a method 1500 for controlling a level of a signal based on a detected unauthorized access to a vehicle CAN port of the signal level control system in accordance with an embodiment of the present teachings.

The communications on the CAN network interface 612 (FIG. 6) is monitored in step 1520. If any unauthorized communication is detected on the CAN network interface as determined at step 1530, a timer is set or otherwise initiated at step 1540, and the gain of the signal level control system is adjusted to bring the PLC signal to a specific low level to prevent PLC output from the and onto the PLC network 18.

The signal is held in the attenuated condition until the timer expires such as determined at step 1560. The timer is incremented at step 1570 until the timer expiration is determined at step 1560.

While the invention has been shown and described with reference to one or more particular embodiments thereof, it will be understood by those of skill in the art that various changes and modifications can be made without departing from the spirit and scope of the invention.

The invention claimed is:

1. A system for controlling a level of communication signals broadcast onto an associated power line communication (PLC) network by an associated transmitting device of an associated vehicle, the system comprising:

an input circuit configured to receive a first communication signal from the associated transmitting device, the first communication signal having a first signal level;

an adjustable amplifier circuit operatively coupled with the input circuit, the adjustable amplifier circuit being configured to apply a selectable gain to the first communication signal to generate a level-adjusted communication signal having a second signal level different than the first signal level of the first communication signal, wherein the selectable gain is based on one or more of a monitored condition of the associated vehicle and/or a monitored condition of the associated PLC network; and an output circuit operatively coupled with the adjustable amplifier circuit, the output circuit being configured to receive the level-adjusted communication signal and to broadcast the level-adjusted communication signal onto the associated PLC network.

2. The system according to claim 1, wherein:

the adjustable amplifier circuit comprises an adjustable attenuation circuit configured to apply a selectable fractional gain to the first communication signal to generate an attenuated communication signal having the second signal level, wherein the second signal level of the attenuated communication signal is less than the first signal level of the first communication signal; and the output circuit is configured to receive the attenuated communication signal and to broadcast the attenuated communication signal onto the associated PLC network.

3. The system according to claim 2, wherein the adjustable attenuation circuit comprises:

a first resister having a first resistance value; and a second resister having a selectable resistance value, wherein the selectable fractional gain comprises a relationship between the first resistance value of the first resister and the selectable resistance value of the second resister.

4. The system according to claim 2, further comprising:

a signal level control module operatively coupled with the adjustable attenuation circuit, the signal level control module comprising:

a memory device;

a processor operatively coupled with the memory device;

level set point data stored in the memory device, the level set point data being representative of a desired communication signal level;

signal level control logic stored in the memory device, the signal level control logic being executable by the processor to determine attenuation command data to set the fractional gain to control the second signal level of the attenuated communication signal to have the desired communication signal level; and a control module output circuit operatively coupled with the memory device and the processor, the control module output circuit being operable to generate an attenuation command signal based on the determined attenuation command data, wherein the adjustable attenuation circuit is responsive to the attenuation command signal to apply the selectable fractional gain to the first communication signal to generate the attenuated communication signal having the desired communication signal level.

5. The system according to claim 4, further comprising:

an input signal level detecting circuit operatively coupled with the signal level control module, the input signal level detecting circuit detecting as the monitored condition of the associated PLC network the first signal level of the first communication signal, wherein the signal level control logic is executable by the processor to determine the attenuation command data based on the first signal level of the first communication signal detected by the input signal level detecting circuit to set the fractional gain to control the second signal level of the attenuated communication signal to have the desired communication signal level.

6. The system according to claim 4, further comprising:

an output signal level detecting circuit operatively coupled with the signal level control module, the output signal level detecting circuit detecting as the monitored condition of the associated PLC network the second signal level of the attenuated communication signal, wherein the signal level control logic is executable by the processor to determine the attenuation command data based on the second signal level of the attenuated communication signal detected by the output signal level detecting circuit to set the fractional gain to control the second signal level of the attenuated communication signal to have the desired communication signal level.

7. The system according to claim 4, further comprising:

a user interface circuit operatively coupled with the signal level control module, the user interface circuit being operative to:

receive a level set point signal from an associated user of the system;

convert the level set point signal received from the associated user to the level set point data; and communicate the level set point data to the signal level control module for storage in the memory device.

8. The system according to claim 4, further comprising:

a network interface circuit operatively coupled with the signal level control module, wherein the processor is operable to execute the signal level control logic stored in the memory device to determine as the monitored condition of the associated vehicle an unauthorized access to the associated transmitting device of the associated vehicle via the network interface circuit, wherein the signal level control logic is executable by the processor to determine the attenuation command data based on the determined unauthorized access to the associated transmitting device of the associated vehicle to set the fractional gain to control the second signal level of the attenuated communication signal to have the desired communication signal level.

9. The system according to claim 8, wherein:

the network interface circuit comprises one or more of an automotive communication interface, an automotive Ethernet interface, a Controller Area Network (CAN) interface, and/or a Joint Test Action Group (JTAG) interface operatively coupled with the signal level control module; and the processor is operable to execute the signal level control logic stored in the memory device to determine as the monitored condition of the associated vehicle the unauthorized access to the associated transmitting device of the associated vehicle via the one or more of the CAN and/or JTAG interfaces to set the fractional gain to control the second signal level of the attenuated communication signal to have the desired communication signal level.

10. The system according to claim 8, wherein:

the network interface circuit comprises a wireless network interface circuit operatively coupled with the signal level control module;

the network interface circuit is operable to wirelessly receive an unauthorized access signal representative of the unauthorized access to the associated transmitting device of the associated vehicle; and the processor is operable to execute the signal level control logic stored in the memory device to determine based on the unauthorized access signal received by the wireless network interface circuit as the monitored condition of the associated vehicle the unauthorized access to the associated transmitting device of the associated vehicle to set the fractional gain to control the second signal level of the attenuated communication signal to have the desired communication signal level.

11. A method for controlling a level of communication signals broadcast onto an associated power line communication (PLC) network by an associated transmitting device of an associated vehicle, the method comprising:

receiving a first communication signal from the associated transmitting device, the first communication signal having a first signal level;

applying a selectable fractional gain to the first communication signal to generate an attenuated communication signal having a second signal level less than the first signal level of the first communication signal, wherein the selectable gain is based on one or more of a monitored condition of the associated vehicle and/or a monitored condition of the associated PLC network; and broadcasting the attenuated communication signal onto the associated PLC network.

12. The method according to claim 11, further comprising:

storing level set point data in a memory device of a signal level control module, the level set point data being representative of a desired communication signal level;

executing signal level control logic stored in the memory device by a processor of the signal level control module to determine attenuation command data to set the fractional gain to control the second signal level of the attenuated communication signal to have the desired communication signal level;

generating by a control module output circuit of the signal level control module an attenuation command signal based on the determined attenuation command data; and applying the selectable fractional gain to the first communication signal by an adjustable attenuation circuit of the signal level control module to generate the attenuated communication signal having the desired communication signal level.

13. The method according to claim 12, further comprising:

detecting as the monitored condition of the associated PLC network the first signal level of the first communication signal; and determining the attenuation command data based on the detected first signal level of the first communication signal to set the fractional gain to control the second signal level of the attenuated communication signal to have the desired communication signal level.

14. The method according to claim 12, further comprising:

detecting as the monitored condition of the associated PLC network the second signal level of the attenuated communication signal; and determining the attenuation command data based on the detected second signal level of the attenuated communication signal to set the fractional gain to control the second signal level of the attenuated communication signal to have the desired communication signal level.

15. The method according to claim 12, further comprising:

receiving via a user interface circuit of the signal level control module a level set point signal from an associated user;

converting the level set point signal received from the associated user to the level set point data; and communicating the level set point data to the signal level control module for storage in the memory device.

16. The method according to claim 12, further comprising:

executing the signal level control logic by the processor of the signal level control module to determine as the monitored condition of the associated vehicle an unauthorized access to the associated transmitting device of the associated vehicle via a network interface circuit; and executing the signal level control logic by the processor to determine the attenuation command data based on the determined unauthorized access to the associated transmitting device of the associated vehicle to set the fractional gain to control the second signal level of the attenuated communication signal to have the desired communication signal level.

17. The method according to claim 16, wherein:

the executing the signal level control logic to determine the unauthorized access to the associated transmitting device of the associated vehicle comprises:

determining the unauthorized access to the associated transmitting device of the associated vehicle via one or more of an automotive communication interface, an automotive Ethernet interface, a Controller Area Network (CAN) interface, and/or a Joint Test Action Group (JTAG) interface operatively coupled with the signal level control module.

18. The method according to claim 16, wherein:

the executing the signal level control logic to determine the unauthorized access to the associated transmitting device of the associated vehicle comprises:

wirelessly receiving an unauthorized access signal representative of the unauthorized access to the associated transmitting device.

19. A non-transitory computer-readable medium storing instructions that, when executed by a computer, cause it to perform a method for controlling a level of communication signals broadcast onto an associated power line communication (PLC) network by an associated transmitting device of an associated vehicle, the method comprising:

receiving a first communication signal from the associated transmitting device, the first communication signal having a first signal level;

applying a selectable fractional gain to the first communication signal to generate an attenuated communication signal having a second signal level less than the first signal level of the first communication signal, wherein the selectable gain is based on one or more of a monitored condition of the associated vehicle and/or a monitored condition of the associated PLC network; and broadcasting the attenuated communication signal onto the associated PLC network.

20. The non-transitory computer-readable medium according to claim 19, further comprising:

executing the signal level control logic by the processor of the signal level control module to determine as the monitored condition of the associated vehicle an unauthorized access to the associated transmitting device of the associated vehicle via a network interface circuit; and executing the signal level control logic by the processor to determine the attenuation command data based on the determined unauthorized access to the associated transmitting device of the associated vehicle to set the fractional gain to control the second signal level of the attenuated communication signal to have the desired communication signal level, wherein the executing the signal level control logic to determine the unauthorized access to the associated transmitting device of the associated vehicle comprises:

determining the unauthorized access to the associated transmitting device of the associated vehicle via one or more of:

an automotive communication interface;

an automotive Ethernet interface;

a Controller Area Network (CAN) interface; and/or a Joint Test Action Group (JTAG) interface operatively coupled with the signal level control module.

* * * * *